United States Patent
Nakashima et al.

(10) Patent No.: US 9,226,277 B2
(45) Date of Patent: Dec. 29, 2015

(54) MOBILE STATION APPARATUS, COMMUNICATION METHOD, INTEGRATED CIRCUIT, RADIO COMMUNICATION SYSTEM, AND CONTROL PROGRAM

(75) Inventors: Daiichiro Nakashima, Osaka (JP); Shoichi Suzuki, Osaka (JP); Wataru Ouchi, Osaka (JP); Tatsushi Aiba, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 447 days.

(21) Appl. No.: 13/578,532

(22) PCT Filed: Dec. 16, 2010

(86) PCT No.: PCT/JP2010/072662
§ 371 (c)(1),
(2), (4) Date: Oct. 25, 2012

(87) PCT Pub. No.: WO2011/099225
PCT Pub. Date: Aug. 18, 2011

(65) Prior Publication Data
US 2013/0034089 A1 Feb. 7, 2013

(30) Foreign Application Priority Data

Feb. 12, 2010 (JP) ................................ 2010-028715

(51) Int. Cl.
*H04W 4/00* (2009.01)
*H04W 72/04* (2009.01)
*H04L 5/00* (2006.01)

(52) U.S. Cl.
CPC ........... *H04W 72/0413* (2013.01); *H04L 5/001* (2013.01); *H04L 5/0048* (2013.01); *H04L 5/0053* (2013.01)

(58) Field of Classification Search
CPC ..... H04L 5/0048; H04L 5/001; H04L 5/0053; H04W 72/0413
USPC .................. 370/210, 203, 329, 344; 375/260
See application file for complete search history.

(56) References Cited

U.S. PATENT DOCUMENTS 8,125,953 B2  2/2012  Matsumoto et al.
8,145,231 B2  3/2012  Matsumoto et al.
(Continued)

FOREIGN PATENT DOCUMENTS

CN        101594683 A       12/2009
WO   WO 2009/022474 A1      2/2009

OTHER PUBLICATIONS

Alcatel-Shanghai Bell, Alcatel-Lucent, CMCC, "On UE Specific SRS Configuration in UpPTS", 3GPP TSG-RAN1 Meeting #54bis, R1-083849, Prague, Czech, Sep. 29-Oct. 3, 2008, 3 pages, "http://www.3gpp.org/ftp/tsg_ran/wg1_rl1/TSGR1_54b/Docs/R1-083849.zip".

(Continued)

*Primary Examiner* — Chandrahas Patel
*Assistant Examiner* — Lan Huong Truong
(74) *Attorney, Agent, or Firm* — Birch, Stewart, Kolasch & Birch, LLP

(57) ABSTRACT

In a radio communication system including a plurality of mobile station apparatuses and a base station apparatus, a physical uplink reference signal and a physical uplink control channel signal are efficiently controlled and the mobile station apparatus appropriately transmits a signal. The mobile station apparatus includes: a radio resource control unit 403 that sets a radio resource of a reference signal for measuring channel quality and a radio resource of a physical uplink control channel; a simultaneous transmission control unit 4051 which, when transmitting the physical uplink control channel signal in a time frame in which the radio resource of the reference signal has been set, controls a signal transmission processing depending on whether each radio resource has been set to the same component frequency band or each radio resource has been set to a different component frequency band; and a transmission processing unit 407 that transmits the reference signal and/or the physical uplink control channel signal based on the control of the simultaneous transmission control unit.

10 Claims, 13 Drawing Sheets

(56) References Cited

U.S. PATENT DOCUMENTS

| | | | |
|---|---|---|---|
| 8,331,947 B2* | 12/2012 | Kim et al. | 455/450 |
| 8,374,076 B2* | 2/2013 | Kim et al. | 370/210 |
| 8,451,778 B2* | 5/2013 | Chung et al. | 370/328 |
| 8,797,968 B2* | 8/2014 | Bertrand et al. | 370/328 |
| 2009/0247229 A1* | 10/2009 | Teo et al. | 455/562.1 |
| 2009/0290549 A1* | 11/2009 | Tiirola et al. | 370/329 |
| 2010/0103902 A1* | 4/2010 | Kim et al. | 370/330 |
| 2011/0032888 A1 | 2/2011 | Matsumoto et al. | |
| 2011/0038271 A1* | 2/2011 | Shin et al. | 370/252 |
| 2011/0081929 A1 | 4/2011 | Matsumoto et al. | |
| 2011/0141928 A1* | 6/2011 | Shin et al. | 370/252 |

OTHER PUBLICATIONS

Panasonic, LGE, NextWave Wireless, "Orthogonal cover sequence for shortened PUCCH format 1a and 1b", 3GPP TSG-RAN Meeting #54, R1-083345, Warsaw, Poland, Jun. 30-Jul. 4, 2008, 4 pages, "http://www.3gpp.org/ftp/tsg_ran/wg1_rl1/TSGR1_54/Docs/R1-083345.zip".

LG Electronics: Uplink transmission under UE transmit power limitation in LTE-Advanced, 3GPP TSG RAN WG1 #58bis, R1-094165, 3GPP, Miyazaki, Japan, Oct. 12-16, 2009.

PCT/ISA/210—International Search Report mailed on Feb. 8, 2011, issued in PCT/JP2010/072662.

Rapporteur (NTT DoCoMo): "Text proposal for RAN1 TR on LTE-Advanced", 3GPP TSG RAN WG1 Meeting #53bis, R1-082723, Warsaw, Poland, Jun. 30-Jul. 4, 2008.

Texas Instruments: "SRS for Carrier Aggregation in LTE-Advanced", 3GPP TSG RAN WG1 #59bis, R1-100458, 3GPP, Valencia, Spain, Jan. 18-22, 2010.

* cited by examiner

FIG.13

ORTHOGONAL SEQUENCE WITH
SEQUENCE LENGTH OF 4

| | |
|---|---|
| FIRST ORTHOGONAL SEQUENCE | $[\,+1 \quad +1 \quad +1 \quad +1\,]$ |
| SECOND ORTHOGONAL SEQUENCE | $[\,+1 \quad -1 \quad +1 \quad -1\,]$ |
| THIRD ORTHOGONAL SEQUENCE | $[\,+1 \quad -1 \quad -1 \quad +1\,]$ |

ORTHOGONAL SEQUENCE
WITH SEQUENCE LENGTH OF 3

| | |
|---|---|
| FIRST ORTHOGONAL SEQUENCE | $[\,+1 \quad +1 \quad +1\,]$ |
| SECOND ORTHOGONAL SEQUENCE | $[\,+1 \quad +e^{j2\pi/3} \quad +e^{j4\pi/3}\,]$ |
| THIRD ORTHOGONAL SEQUENCE | $[\,+1 \quad +e^{j4\pi/3} \quad +e^{j2\pi/3}\,]$ |

MOBILE STATION APPARATUS, COMMUNICATION METHOD, INTEGRATED CIRCUIT, RADIO COMMUNICATION SYSTEM, AND CONTROL PROGRAM

TECHNICAL FIELD

The present invention relates to, mobile station apparatuses, communication methods, integrated circuits, radio communication systems, and control programs capable of efficiently controlling a physical uplink reference signal and a physical uplink control channel signal in a radio communication system including a plurality of mobile station apparatuses and abase station apparatus, in which the mobile station apparatus can appropriately transmit the signals.

BACKGROUND ART

In the 3GPP (3rd Generation Partnership Project), the standard of EUTRA (Evolved Universal Terrestrial Radio Access; hereinafter referred to as "EUTRA") is already established, and a study on a radio access scheme (Advanced EUTRA; hereinafter referred to as "A-EUTRA"), which is an evolved EUTRA, is being started.

<EUTRA SRS>

In E-UTRA, for example, a sounding reference signal (SRS) is already specified in order for a base station apparatus to measure an uplink channel quality. A mobile station apparatus transmits the sounding reference signal through the use of a radio resource that is set in advance by the base station apparatus. To the mobile station apparatus, a radio resource for periodically transmitting the sounding reference signal is allocated or a radio resource for transmitting the sounding reference signal only once is allocated. The sounding reference signal is transmitted only in a periodic subframe (referred to as an SRS subframe) of a physical uplink that is set in advance by a base station apparatus. Moreover, the sounding reference signal is transmitted using the last SC-FDMA (Single Carrier-Frequency Division Multiple Access) symbol of an uplink subframe.

<EUTRA PUCCH>

In E-UTRA, for example, a physical uplink control channel (PUCCH) is already specified in order for a mobile station apparatus to transmit a scheduling request. The scheduling request means that a mobile station apparatus requires a radio resource allocation of a physical uplink shared channel (PUSCH), of a base station apparatus. When making the scheduling request, a mobile station apparatus transmits a physical uplink control channel signal through the use of a periodic radio resource that is set in advance by a base station apparatus. When not making the scheduling request, a mobile station apparatus does not transmit a signal for the scheduling request even if a radio resource has been allocated.

In E-UTRA, there are two types of formats of the physical uplink control channel signal which are used for transmitting a scheduling request (hereinafter, referred to as a first format and a second format). The first format is a format, in which a radio resource in a time domain to which a sounding reference signal may be allocated, i.e., an SC-FDMA symbol to which a sounding reference signal may be allocated, is used for transmission of a scheduling request, while the second format is a format, in which a radio resource in a time domain to which a sounding reference signal may be allocated, i.e., an SC-FDMA symbol to which a sounding reference signal may be allocated, is not used for transmission of a scheduling request.

<Simultaneous Generation of EUTRA SRS and PUCCH>

In E-UTRA, a mode in which a mobile station apparatus can simultaneously transmit a sounding reference signal and a physical uplink control channel signal, and a mode in which a mobile station apparatus cannot transmit a sounding reference signal when the mobile station apparatus transmits a physical uplink control channel signal, are switched and used by a base station apparatus. When a sounding reference signal and a physical uplink control channel signal are simultaneously transmitted in the same subframe, the second format is used as the format for the physical uplink control channel signal.

More specifically, in the sounding reference signal subframe, control information indicating whether, as the format for the physical uplink control channel signal, the first format is used or the second format is used is broadcasted from a base station apparatus to mobile station apparatuses. When in a sounding reference signal subframe, the control information indicating that the first format is used as the format of a physical uplink control channel signal is provided by a base station apparatus, a mobile station apparatus transmits a physical uplink control channel signal by using the first format in the sounding reference signal subframe, and furthermore, when a physical uplink control channel signal is transmitted in the sounding reference signal subframe to which the radio resource for the sounding reference signal has been allocated, the mobile station apparatus transmits only a physical uplink control channel signal without transmitting the sounding reference signal.

When in a sounding reference signal subframe, the control information indicating that the second format is used as the format of a physical uplink control channel signal is provided by a base station apparatus, a mobile station apparatus transmits a physical uplink control channel signal using the second format in the sounding reference signal subframe, and furthermore, when a physical uplink control channel signal transmitted in the sounding reference signal subframe to which the radio resource for the sounding reference signal has been allocated, the mobile station apparatus simultaneously transmits the sounding reference signal and the physical uplink control channel signal.

<Component Carrier Aggregation>

In contrast, in A-EUTRA, supporting a frequency band wider than in EUTRA and securing the compatibility with EUTRA are being examined. Therefore, in A-EUTRA, a technique (may be referred to as also spectrum aggregation or carrier aggregation) is being examined, in which a base station apparatus carries out communications using a system bandwidth composed of a plurality of component frequency bands, with the frequency band of EUTRA as one unit (one component frequency band) (it should be noted that, the component frequency band may be referred to as also a carrier component or a component carrier (see non-Patent Document 1). In this technique, a base station apparatus carries out communications with an EUTRA-compliant mobile station apparatus by using either one component frequency band in an uplink and in a downlink, respectively, and carries out communications with an A-EUTRA-compliant mobile station apparatus by using one or more component frequency bands in an uplink and in a downlink, respectively.

PRIOR ART DOCUMENTS

Non Patent Document

NON PATENT LITERATURE 1: 3GPP TSG RAN1 #53bis, Warsaw, Poland, and 30 Jun.-4 Jul., 2008, R1-082723 "Text proposal for RAN1 TR on LTE-Advanced"

DISCLOSURE OF THE INVENTION

Problems to be Solved by the Invention

Also in A-EUTRA using a plurality of component frequency bands, a mobile station apparatus needs to efficiently control the transmission processing of a sounding reference signal and a physical uplink control channel signal. However, with regard to the control of the transmission processing of signals of a mobile station apparatus when a sounding reference signal and a physical uplink control channel signal are simultaneously generated in different component frequency bands, no document refers to this point as far as the inventor knows at present. In order to improve the efficiency of the scheduling, adaptive modulation, and transmit power control using the uplink channel quality in a base station apparatus, it is preferable that the mobile station apparatus can transmit the sounding reference signal as much as possible. In contrast, in order to keep the delay required by a mobile station apparatus to complete the transmission of data, small, it is preferable that the mobile station apparatus can reliably transmit the physical uplink control channel signal including a scheduling request.

The present invention has been made in view of the above circumstances, and an object of the present invention is to provide a mobile station apparatus, a communication method, an integrated circuit, a radio communication system, and a control program capable of efficiently controlling a physical uplink reference signal and a physical uplink control channel signal in a radio communication system including a plurality of mobile station apparatuses and a base station apparatus, in which the mobile station apparatus can appropriately transmit the signals.

Means for Solving the Problems (1) In order to achieve the above-described objective, an embodiment of the present invention employs the following configuration. That is, a mobile station apparatus of the present invention is the mobile station apparatus transmitting a signal by using one or more component frequency bands which are applied to a radio communication system including a plurality of mobile station apparatuses and a base station apparatus transmitting/receiving a signal to/from the plurality of mobile station apparatuses and each of which has a predetermined frequency bandwidth, and the mobile station apparatus includes: a radio resource control unit that sets a radio resource of a reference signal for measuring channel quality and a radio resource of a physical uplink control channel; a simultaneous transmission control unit which, when transmitting a signal of the physical uplink control channel in a time frame in which the radio resource of the reference signal has been set, controls a signal transmission processing depending on whether each radio resource has been set to the same component frequency band or each radio resource has been set to a different component frequency band; and a transmission processing unit that transmits the reference signal and/or physical uplink control channel signal based on the control of the simultaneous transmission control unit.

In this manner, when transmitting a physical uplink control channel signal in a time frame in which the radio resource of a reference signal has been set, the signal transmission processing is controlled depending on whether each radio resource has been set to a same component frequency band or each radio resource has been set to a different component frequency band, and thus the physical uplink control information and the reference signal can be efficiently transmitted.

(2) Furthermore, in the mobile station apparatus of an embodiment of the present invention, the simultaneous transmission control unit controls the transmission processing in accordance with the format of a physical uplink control channel signal.

In this manner, the transmission processing is controlled in accordance with the format of a physical uplink control channel signal, and thus the transmission processing control suitable for each format can be carried out and the uplink control information and the reference signal can be efficiently transmitted.

(3) Moreover, in the mobile station apparatus of an embodiment of the present invention, the format of a physical uplink control channel signal is either one of a first format, in which a radio resource in a time domain, to which the radio resource of the reference signal may be allocated, is used, and a second format, in which a radio resource in a time domain, to which the radio resource of the reference signal may be allocated, is not used.

In this manner, the format of a physical uplink control channel signal is either one of the first format and the second format, and thus the transmission processing control suitable for each format can be carried out and the uplink control information and the reference signal can be efficiently transmitted.

(4) In addition, in the mobile station apparatus of an embodiment of the present invention, the simultaneous transmission control unit, when the format of a physical uplink control channel signal is the first format and the radio resources of the reference signal and the physical uplink control channel have been set to the same component frequency band by the radio resource control unit, performs control so as to transmit the physical uplink control channel signal without transmitting the reference signal, while when the format of a physical uplink control channel signal is the first format and the radio resources of the reference signal and the physical uplink control channel have been set to a different component frequency band, respectively, by the radio resource control unit, the simultaneous transmission control unit performs control so as to simultaneously transmit the reference signal and the physical uplink control channel signal.

In this manner, in the case where the format of a physical uplink control channel signal is the first format, a mobile station apparatus, when the radio resources of a reference signal and a physical uplink control channel signal have been set to the same uplink component frequency band, performs control so as to transmit only the physical uplink control channel signal without transmitting the reference signal. Therefore, an orthogonal sequence having the same sequence length as that of a physical uplink control channel with respect to a different mobile station apparatus, in which a radio resource in the same frequency domain as this physical uplink control channel is used, is appropriately used, and thus the orthogonalization between the physical uplink control channel signals can be reliably realized. Moreover, when the radio resources of a reference signal and a physical uplink control channel signal have been set to a different uplink component frequency band, respectively, the mobile station apparatus performs control so as to simultaneously transmit the reference signal and the physical uplink control channel signal. Therefore, the base station apparatus can reliably achieve the orthogonalization between the signals of the physical uplink control channels with respect to the different mobile station apparatuses, in which a radio resource in the same frequency domain as this physical uplink control channel is used, and also can measure the uplink channel quality of an uplink component frequency band, in which the reference signal has been transmitted. Hence, a mobile station apparatus can reliably transmit a scheduling request to a base station apparatus and keep the delay required to complete the transmission of data small, while a base station apparatus can improve the efficiency of scheduling, adaptive modulation, and transmit power control by using the measured uplink channel quality.

(5) Furthermore, in the mobile station apparatus of an embodiment of the present invention, the simultaneous transmission control unit, when the format of a physical uplink control channel signal is the second format and the radio resources of a reference signal and a physical uplink control channel have been set to the same component frequency band by the radio resource control unit, performs control so as to simultaneously transmit the reference signal and the physical uplink control channel signal. In contrast, when the format of the physical uplink control channel signal is the second format and the radio resources of the reference signal and the physical uplink control channel have been set to a different component frequency band, respectively, by the radio resource control unit, the simultaneous transmission control unit performs control so as to simultaneously transmit the reference signal and the physical uplink control channel signal.

In this manner, when the format of a physical uplink control channel signal is the second format, the mobile station apparatus, when the radio resources of a reference signal and the physical uplink control channel signal have been set to the same uplink component frequency band, performs control so as to simultaneously transmit the reference signal and the physical uplink control channel signal. Therefore, the mobile station apparatus can reliably achieve the orthogonalization between the signals of the physical uplink control channels with respect to the different mobile station apparatuses, in which a radio resource in the same frequency domain as this physical uplink control channel is used, and also can measure the uplink channel quality of an uplink component frequency band, in which the reference signal has been transmitted. Moreover, when the radio resources of a reference signal and a physical uplink control channel signal have been set to a different uplink component frequency band, respectively, the mobile station apparatus performs control so as to simultaneously transmit the reference signal and the physical uplink control channel signal. Therefore, the mobile station apparatus can reliably achieve the orthogonalization between the signals of the physical uplink control channels with respect to the different mobile station apparatuses, in which a radio resource in the same frequency domain as this physical uplink control channel is used, and also can measure the uplink channel quality of an uplink component frequency band, in which the reference signal has been transmitted. Therefore, the mobile station apparatus can reliably transmit a scheduling request to a base station apparatus and keep the delay required to complete the transmission of data small, while the base station apparatus can improve the efficiency of scheduling, adaptive modulation, and transmit power control by using the measured uplink channel quality.

(6) Moreover, in the mobile station apparatus of an embodiment of the present invention, the simultaneous transmission control unit, when the format of a physical uplink control channel signal is the first format and the radio resources of the reference signal and the physical uplink control channel have been set to a different component frequency band, respectively, by the radio resource control unit, performs control so as to transmit the physical uplink control channel signal without transmitting the reference signal. In contrast, when the format of a physical uplink control channel signal is the second format and the radio resources of the reference signal and the physical uplink control channel have been set to a different component frequency band, respectively, by the radio resource control unit, the simultaneous transmission control unit performs control so as to simultaneously transmit the reference signal and the physical uplink control channel signal.

In this manner, when the format of a physical uplink control channel signal is the first format and the radio resources of the reference signal and the physical uplink control channel signal have been set to a different uplink component frequency band, respectively, the simultaneous transmission control unit performs control so as to transmit the physical uplink control channel signal without transmitting the reference signal. In contrast, when the format of a physical uplink control channel signal is the second format and the radio resources of the reference signal and the physical uplink control channel signal have been set to a different uplink component frequency band, respectively, the simultaneous transmission control unit performs control so as to simultaneously transmit the reference signal and the physical uplink control channel signal. Therefore, a physical uplink control channel signal and a reference signal can be appropriately transmitted in consideration of the restrictions on transmit power. A mobile station apparatus with the remaining small transmit power capable of transmission, in which the simultaneous transmission of the signals with different uplink component frequency bands is basically prohibited by a base station apparatus, when the first format is used for the physical uplink control channel signal and the radio resources of the reference signal and the physical uplink control channel signal have been set to a different uplink component frequency band, respectively, transmits only the physical uplink control channel signal without transmitting the reference signal for the reason of the restriction on the transmit power. In contrast, when the second format is used for the physical uplink control channel signal and the radio resources of the reference signal and the physical uplink control channel signal have been set to a different uplink component frequency band, respectively, this mobile station apparatus can simultaneously transmit the reference signal and the physical uplink control channel signal in the same uplink subframe without concern for the restrictions on the transmit power. The radio resources of a reference signal and a physical uplink control channel signal of a different uplink component frequency band are set to different SC-FDMA symbols, respectively, and a mobile station apparatus does not essentially simultaneously-transmit the signals with different uplink component frequency bands in the unit of SC-FDMA symbol, and the transmit powers required for the respective reference signal and physical uplink control channel signal are not simultaneously generated. Therefore, a mobile station apparatus with the remaining small transmit power capable of transmission, when the format of a physical uplink control channel signal is the second format, can simultaneously transmit the reference signal and the physical uplink control channel signal, whose radio resources are set to a different uplink component frequency band, respectively, in the same uplink subframe.

(7) Moreover, a communication method of an embodiment of the present invention is the communication method of transmitting a signal by using one or more component frequency bands which are applied to a radio communication system including a plurality of mobile station apparatuses and a base station apparatus transmitting/receiving a signal to/from the plurality of mobile station apparatuses and each of which has a predetermined frequency bandwidth, in which the method includes at least the steps of: setting a radio resource of a reference signal for measuring channel quality and a radio resource of a physical uplink control channel in the mobile station apparatus; controlling a signal transmission processing depending on whether each radio resource has been set to the same component frequency band or each radio resource has been set to a different, when transmitting the physical uplink control channel signal in a time frame in which the radio resource of the reference signal has been set; and transmitting the reference signal and/or physical uplink control channel signal based on the control of the signal transmission processing.

In this manner, the signal transmission processing is controlled depending on whether each radio resource has been set to a same component frequency band or each radio resource has been set to a different, when transmitting the physical uplink control channel signal in a time frame in which the radio resource of the reference signal has been set, and thus, uplink control information and the reference signal can be efficiently transmitted.

(8) Furthermore, an integrated circuit of an embodiment of the present invention is an integrated circuit causing a mobile station apparatus to perform a plurality of functions when being mounted on the mobile station apparatus, the integrated circuit causing the mobile station apparatus to perform a series of functions including the functions of: transmitting a signal to a base station apparatus by using one or more component frequency bands each having a predetermined frequency bandwidth; setting a radio resource of a reference signal for measuring channel quality and a radio resource of a physical uplink control channel; controlling a signal transmission processing depending on whether each radio resource has been set to a same component frequency band or each radio resource has been set to a different, when transmitting the physical uplink control channel signal in a time frame in which the radio resource of the reference signal has been set; and transmitting the reference signal and/or physical uplink control channel signal based on the control of the signal transmission processing.

In this manner, when transmitting a physical uplink control channel signal in a time frame in which the radio resource of the reference signal has been set, the signal transmission processing is controlled depending on whether each radio resource has been set to a same component frequency band or each radio resource has been set to a different component frequency band, and thus, uplink control information and the reference signal can be efficiently transmitted.

(9) In addition, a radio communication system of an embodiment of the present invention is the radio communication system including a plurality of mobile station apparatuses and a base station apparatus transmitting/receiving a signal to/from the plurality of mobile station apparatuses by using one or more component frequency bands each having a predetermined frequency bandwidth, in which the base station apparatus includes a reception processing unit receiving a signal transmitted from the mobile station apparatus, in which the mobile station apparatus includes: a radio resource control unit that sets a radio resource of a reference signal for measuring channel quality and a radio resource of a physical uplink control channel; a simultaneous transmission control unit which, when transmitting the physical uplink control channel signal in a time frame in which the radio resource of the reference signal has been set, controls a signal transmission processing depending on whether each radio resource has been set to a same component frequency band or each radio resource has been set to a different component frequency band; and a transmission processing unit that transmits the reference signal and/or physical uplink control channel signal based on the control of the simultaneous transmission control unit.

In this manner, when transmitting a physical uplink control channel signal in a time frame in which the radio resource of a reference signal has been set, the signal transmission processing is controlled depending on whether each radio resource has been set to a same component frequency band or each radio resource has been set to a different component frequency band, and thus, uplink control information and the reference signal can be efficiently transmitted.

(10) Moreover, a control program of an embodiment of the present invention is the control program of a mobile station apparatus transmitting a signal by using one or more component frequency bands which are applied to a radio communication system including a plurality of mobile station apparatuses and a base station apparatus transmitting/receiving a signal to/from the plurality of mobile station apparatuses and each of which has a predetermined frequency bandwidth, and the control program converts a series of processing into commands so as to enable a computer to read and execute them, the series of processing including processing of: setting a radio resource of a reference signal for measuring channel quality and a radio resource of a physical uplink control channel; controlling a signal transmission processing depending on whether each radio resource has been set to the same component frequency band or each radio resource has been set to a different, when transmitting a signal of the physical uplink control channel in a time frame in which the radio resource of the reference signal has been set; and transmitting the reference signal and/or physical uplink control channel signal based on the control of a signal transmission processing.

In this manner, when transmitting s physical uplink control channel signal in a time frame in which the radio resource of s reference signal has been set, the signal transmission processing is controlled depending on whether each radio resource has been set to a same component frequency band or each radio resource has been set to a different component frequency band, and thus, uplink control information and the reference signal can be efficiently transmitted.

Advantageous Effects of Invention

According to the present invention, the mobile station apparatus can appropriately transmit a physical uplink reference signal and a physical uplink control channel signal even when the radio resources of the physical uplink reference signal and the physical uplink control channel signal have been set in the same uplink subframe. Thus, the mobile station apparatus can reliably transmit the physical uplink control channel signal to a base station apparatus and keep the delay required to complete the transmission of data small, while the base station apparatus can improve the efficiency of scheduling, adaptive modulation, and transmit power control by using the measured uplink channel quality.

BRIEF DESCRIPTION OF THE DRAWINGS

FIG. 13 is a table showing orthogonal sequences multiplied to a physical uplink control channel that is used to transmit a scheduling request, in the embodiment of the present invention.

BEST MODES FOR CARRYING OUT THE INVENTION

Hereinafter, an embodiment of the present invention will be described in detail with reference to the accompanying drawings. First, by using FIG. 10 to FIG. 13, the entire picture of a radio communication system and the configuration of a radio frame according to the embodiment are described.

Next, by using FIG. 1 to FIG. 6, the configuration of the radio communication system according to the embodiment will be described. Next, using FIG. 7 to FIG. 8, the operation processing of the radio communication system according to the embodiment will be described.

<Entire Picture of the Radio Communication System>

Figure 10:
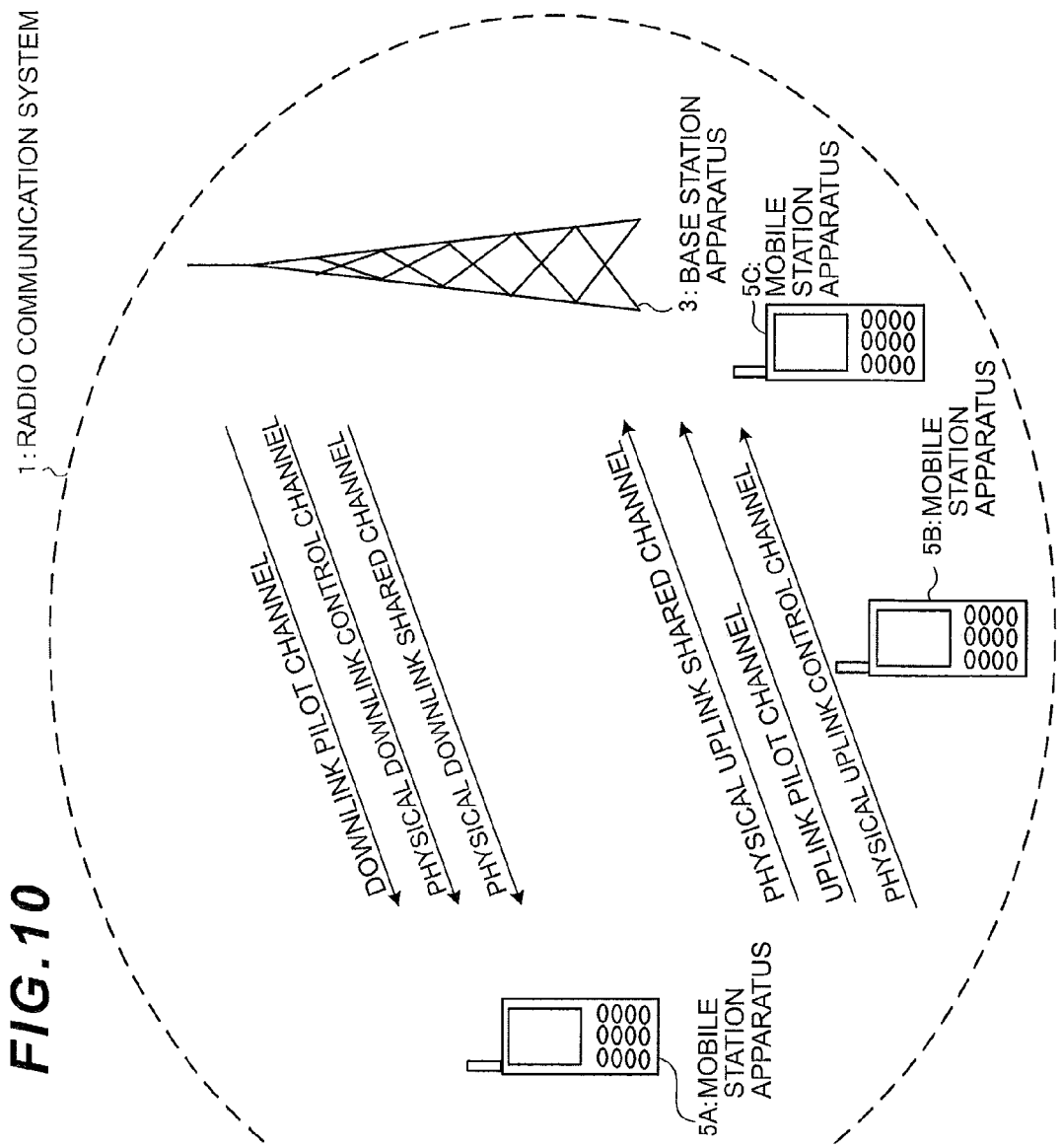
FIG. 10 is a diagram illustrating an overview of the entire picture of a radio communication system according to the embodiment of the present invention.

FIG. 10 is a diagram illustrating the overview of an entire picture of the radio communication system according to the embodiment of the present invention. In a radio communication system 1 shown by FIG. 10, a base station apparatus 3 and a plurality of mobile station apparatuses 5A, 5B, and 5C carry out radio communications with each other. Moreover, FIG. 10 shows that a downlink that is a communication direction from the base station apparatus 3 to the mobile station apparatuses 5A, 5B, and 5C includes a downlink pilot channel, a physical downlink control channel (referred to as also a PDCCH), a physical downlink shared channel (referred to as also a PDSCH). Moreover, FIG. 10 shows that an uplink that is a communication direction from the mobile station apparatuses 5A, 5B, and 5C to the base station apparatus 3 includes a physical uplink shared channel (referred to as also a PUSCH), an uplink pilot channel, and a physical uplink control channel (referred to as also a PUCCH). Furthermore, an area the base station apparatus 3 administrates is referred to as a cell. Hereinafter, in the embodiment, the mobile station apparatuses 5A, 5B, and 5C are referred to as a mobile station apparatus 5 and will be described.

<Configuration of the Downlink Radio Frame>

Figure 11:
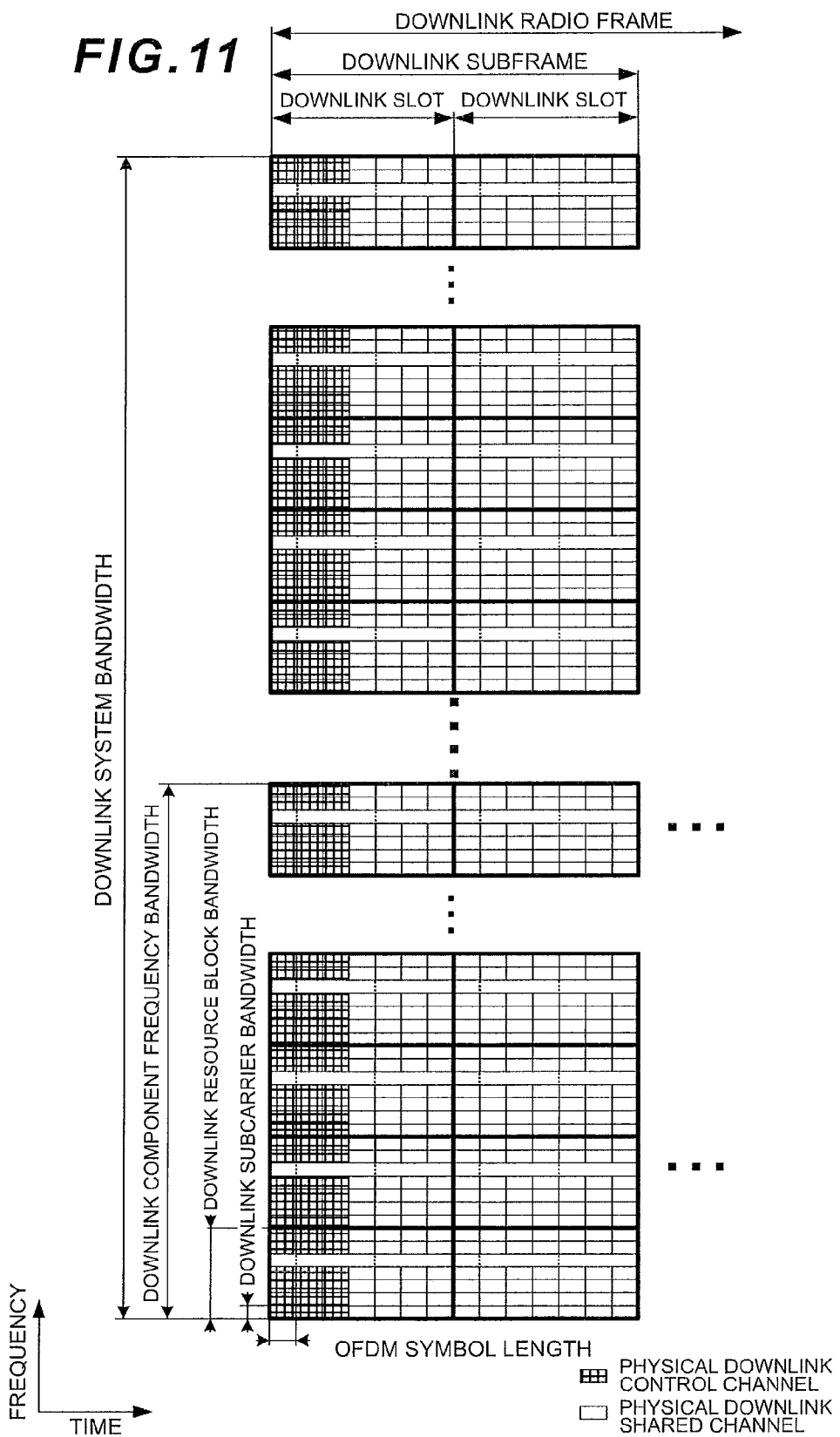
FIG. 11 is a diagram showing the schematic configuration of a radio frame of a downlink (referred to as a downlink radio frame) from the base station apparatus to the mobile station apparatus 5 according to the embodiment of the present invention.

FIG. 11 is a diagram showing the schematic configuration of the radio frame of a downlink (referred to as a downlink radio frame) from the base station apparatus 3 to the mobile station apparatus 5 according to the embodiment of the present invention. In FIG. 11, the horizontal axis represents a frequency domain and the vertical axis represents a time domain. The downlink radio frame is a unit of radio resource allocation or the like, and is composed of a pair of resource blocks (referred to as a downlink resource block pair) including a predetermined frequency band and time slot of a downlink. One downlink resource block pair is composed of two resource blocks contiguous in the time domain of a downlink (referred to as downlink resource blocks).

Moreover, in FIG. 11, one downlink resource block is composed of 12 subcarriers in the frequency domain of a downlink (referred to as downlink subcarriers) and is composed of seven OFDM symbols in the time domain. A system bandwidth of a downlink (referred to as a downlink system bandwidth) is the communication bandwidth of a downlink of the base station apparatus 3, and is composed of a plurality of component frequency bandwidths of a downlink (referred to as downlink component frequency bandwidths). In the radio communication system 1, the component frequency band of a downlink (referred to as a downlink component frequency band) is the bandwidth of a predetermined frequency bandwidth, and the downlink component frequency bandwidth is the frequency bandwidth of a downlink component frequency band. For example, the system bandwidth of a downlink (referred to as a downlink system bandwidth) with a bandwidth of 40 MHz is composed of two downlink component frequency bands with a bandwidth of 20 MHz.

It should be noted that, in a downlink component frequency band, a plurality of downlink resource blocks is arranged in accordance with the downlink component frequency bandwidth. For example, a downlink component frequency band with a bandwidth of 20 MHz is composed of 100 downlink resource blocks. Moreover, for example, the downlink component frequency bandwidth is the frequency bandwidth the EUTRA-compliant mobile station apparatus 5 can use for communications, and the downlink system bandwidth is the frequency bandwidth the A-EUTRA-compliant mobile station apparatus 5 can use for communications.

Furthermore, in the time domain shown by FIG. 11, there are a slot (referred to as a downlink slot) composed of seven OFDM symbols, a subframe (referred to as a downlink subframe) composed of two downlink slots, and a downlink radio frame composed of ten downlink subframes. It should be noted that a unit composed of one downlink subcarrier and one OFDM symbol is referred to as a resource element (a downlink resource element). In each downlink subframe, at least a physical downlink shared channel used for transmission of information data and a physical downlink control channel used for transmission of control data are arranged. In FIG. 11, the physical downlink control channel is composed of the first to third OFDM symbols of a downlink subframe, and the physical downlink shared channel is composed of the fourth to fourteenth OFDM symbols of a downlink subframe.

Although illustration is omitted in FIG. 11, a reference signal of a downlink pilot channel (referred to as a downlink reference signal) used in estimation of the channel variation in a physical downlink shared channel and in a physical downlink control channel is distributed and arranged in a plurality of downlink resource elements. Here, the downlink reference signal is a known signal, which is used for a downlink pilot channel, in the radio communication system 1.

It should be noted that one physical downlink shared channel is composed of one or more downlink resource blocks within the same downlink component frequency band, and one physical downlink control channel is composed of a plurality of downlink resource elements within the same downlink component frequency band. Within a downlink system bandwidth, a plurality of physical downlink shared channels and a plurality of physical downlink control channels are arranged. The base station apparatus 3 can arrange one physical downlink control channel and one physical downlink shared channel within the same downlink component frequency band in the same downlink subframe with respect to one EUTRA-compliant mobile station apparatus 5, and can arrange a plurality of physical downlink control channels and a plurality of physical downlink shared channels in the same downlink subframe with respect to one A-EUTRA-compliant mobile station apparatus 5. It should be noted that the base station apparatus 3 can arrange a plurality of physical downlink control channels within the same downlink component frequency band in the same downlink subframe, with respect to one A-EUTRA-compliant mobile station apparatus 5. However, the base station apparatus 3 cannot arrange a plurality of physical downlink shared channels within the same downlink component frequency band, but can arrange each physical downlink shared channel in a different downlink component frequency band.

In the physical downlink control channel, a signal generated from control data, such as a mobile station identifier, information about radio resource allocation of a physical downlink shared channel, information about radio resource allocation of a physical uplink shared channel, multi-antenna related information, a modulation scheme, a coding rate, and a retransmission parameter, is arranged. It should be noted that one physical downlink control channel includes only the information about radio resource allocation of one physical downlink shared channel or the information about radio resource allocation of one physical uplink shared channel, and does not include the information about radio resource allocation of a plurality of physical downlink shared channels or the information about radio resource allocation of a plurality of physical uplink shared channels.

<Configuration of the Uplink Radio Frame>

Figure 12:
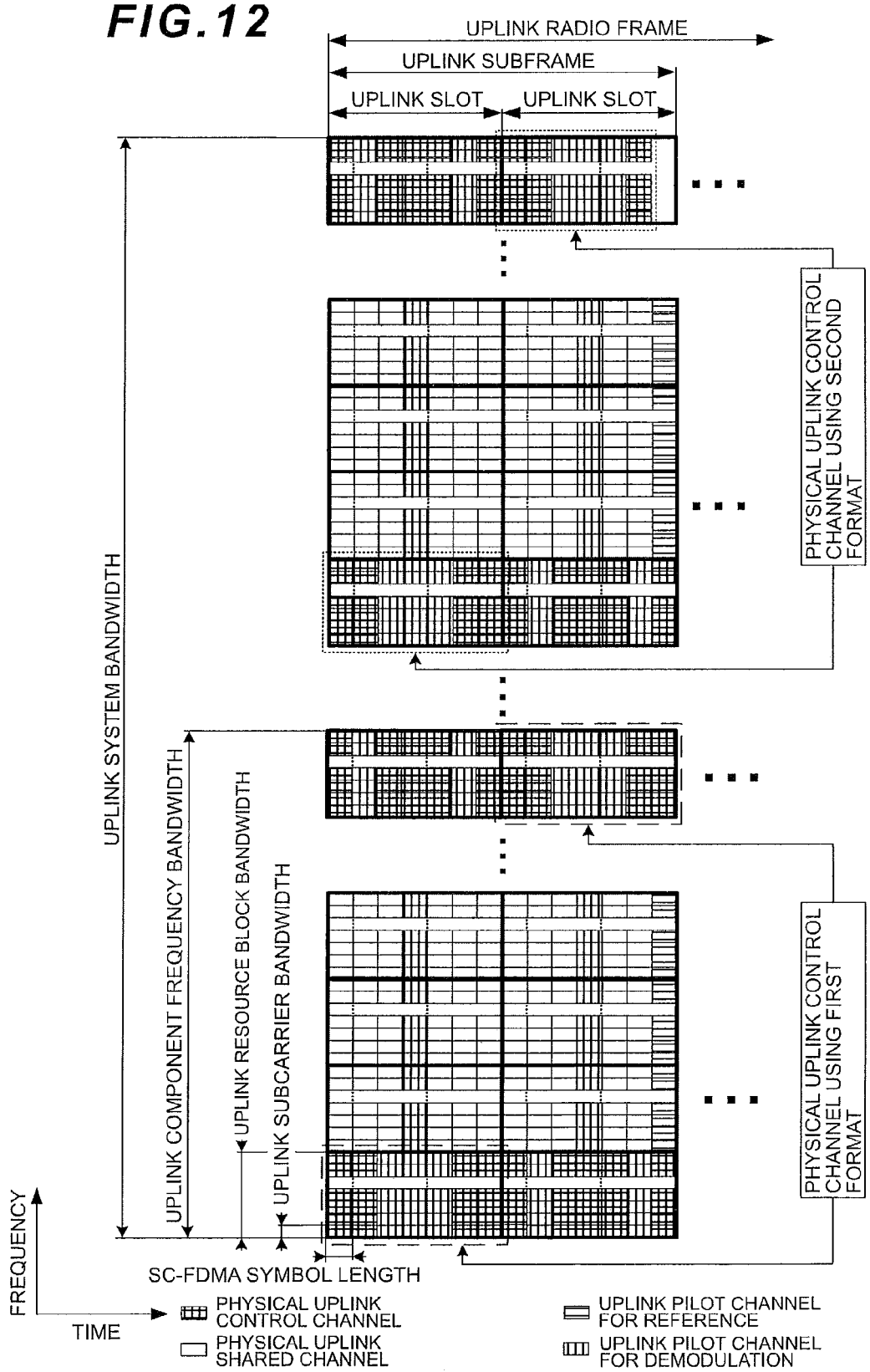
FIG. 12 is a diagram showing the schematic configuration of a radio frame of an uplink (referred to as an uplink radio frame) from the base station apparatus 3 to the mobile station apparatus 5 according to the embodiment of the present invention.

FIG. 12 is a diagram showing the schematic configuration of a radio frame of an uplink (referred to as an uplink radio frame) from the mobile station apparatus 5 to the base station apparatus 3 according to the embodiment of the present invention. In FIG. 12, the horizontal axis represents a frequency domain and the vertical axis represents a time domain. The uplink radio frame is a unit of radio resource allocation or the like, and is composed of a pair of resource blocks (referred to as an uplink resource block pair) including a predetermined frequency band and time width of an uplink. One uplink resource block pair is composed of two resource blocks contiguous in the time domain of an uplink (referred to as uplink resource blocks).

Moreover, in FIG. 12, one uplink resource block is composed of 12 subcarriers in the frequency domain of an uplink (referred to as uplink subcarriers) and is composed of seven SC-FDMA symbols in the time domain. A system bandwidth of an uplink (referred to as an uplink system bandwidth) is the communication bandwidth width of an uplink of the base station apparatus 3, and is composed of a plurality of component frequency bandwidths of an uplink (referred to as uplink component frequency bandwidths). In the radio communication system 1, the component frequency band of an uplink (referred to as an uplink component frequency band) is the bandwidth of a predetermined frequency bandwidth, and the uplink component frequency bandwidth is the frequency bandwidth of an uplink component frequency band. For example, a system bandwidth of an uplink (referred to as an uplink system bandwidth) with a bandwidth of 40 MHz is composed of two uplink component frequency bands with a bandwidth of 20 MHz.

It should be noted that, in an uplink component frequency band, a plurality of uplink resource blocks is arranged in accordance with an uplink component frequency bandwidth. For example, an uplink component frequency band with a bandwidth of 20 MHz is composed of 100 uplink resource blocks. Furthermore, for example, the uplink component frequency bandwidth is the frequency bandwidth the EUTRA-compliant mobile station apparatus 5 can use for communications, and the uplink system bandwidth is the frequency bandwidth the A-EUTRA-compliant mobile station apparatus 5 can use for communications.

Moreover, in the time domain shown by FIG. 12, there are a slot (referred to as an uplink slot) composed of g seven SC-FDMA symbols, a subframe (referred to as an uplink subframe) composed of two uplink slots, and an uplink radio frame composed of ten uplink subframes. It should be noted that a unit composed of one uplink subcarrier and one SC-FDMA symbol is referred to as a resource element (referred to as an uplink resource element).

In each uplink subframe, at least a physical uplink shared channel used for transmission of information data and a physical uplink control channel used for transmission of control data are arranged. The physical uplink control channel is used to transmit the control data including a scheduling request, and a channel quality indicator with respect to a downlink or a reception confirmation response with respect to a physical downlink shared channel. The present invention is directed to the physical uplink control channel used to transmit a scheduling request.

There are two types of formats (hereinafter, referred to as a first format and a second format) of a physical uplink control channel signal that are used to transmit a scheduling request. As shown in FIG. 12, the first format is a format, in which a radio resource in the time domain to which a sounding reference signal may be allocated, i.e., an SC-FDMA symbol to which a sounding reference signal may be allocated, is used, while the second format is a format, in which a radio resource in the time domain to which a sounding reference signal may be allocated, i.e., an SC-FDMA symbol to which a sounding reference signal may be allocated, is not used.

For the first format, the first to the seventh SC-FDMA symbols of the first uplink slot and the first to the seventh SC-FDMA symbols of the second uplink slot of the uplink subframe are used. For the second format, the first to the seventh SC-FDMA symbols of the first uplink slot and the first to the sixth SC-FDMA symbols of the second uplink slot of the uplink subframe are used. For the first format, the seventh SC-FDMA symbol of the second uplink slot of the uplink subframe is used, while for the second format, the seventh SC-FDMA symbol of the second uplink slot of the uplink subframe is not used. For the physical uplink control channel used to transmit a scheduling request, an orthogonal sequence is multiplied to an SC-FDMA symbol in a unit of uplink slot in the time domain.

FIG. 13 is a table showing orthogonal sequences multiplied to a physical uplink control channel that is used to transmit a scheduling request in the embodiment of the present invention. Two types of orthogonal sequences each having a different sequence length are used, and three orthogonal sequences are used for each sequence length. With respect to a physical uplink control channel of the first format, any of the orthogonal sequences of the sequence length 4 in the first uplink slot and the second uplink slot of the uplink subframe is used, and each symbol of this sequence is multiplied to the first, the second, the sixth, and the seventh SC-FDMA symbols of each uplink slot.

For the physical uplink control channel of the second format, any of the orthogonal sequences of the sequence length 4 in the first uplink slot of the uplink subframe is used, and each symbol of the orthogonal sequence is multiplied to the first, the second, the sixth, and the seventh SC-FDMA symbols of the first uplink slot, and any of the orthogonal sequences of the sequence length 3 in the second uplink slot of the uplink subframe is used, and each symbol of the orthogonal sequence is multiplied to the first, the second, and the sixth SC-FDMA symbols of the second uplink slot. A plurality of physical uplink control channels is arranged in the same uplink resource block, and each physical uplink control channel arranged in the same uplink resource block is orthogonally multiplexed by the orthogonal sequence. Furthermore, in order to achieve suitable orthogonal multiplexing, an orthogonal sequence of the same sequence length is used for at least a physical uplink control channel arranged in the same uplink resource block.

It should be noted that one physical uplink shared channel is composed of one or more uplink resource blocks within the same uplink component frequency band, and one physical uplink control channel is composed of two uplink resource blocks having a symmetric relation with respect to the frequency domain within the same uplink component frequency band, the two uplink resource blocks each being located in a different uplink slot. For example, in FIG. 12, within an uplink subframe within an uplink component frequency band having the lowest frequency, one uplink resource block pair used in a physical uplink control channel is composed of an uplink resource block with the lowest frequency of the first uplink slot and an uplink resource block with the highest frequency of the second uplink slot.

A plurality of physical uplink shared channels and a plurality of physical uplink control channels are arranged within an uplink system bandwidth. The base station apparatus 3 can allocate one radio resource of a physical uplink control channel and one radio resource of a physical uplink shared channel, respectively, within the same uplink component frequency band in the same uplink subframe, with respect to one EUTRA-compliant mobile station apparatus 5. Furthermore, the base station apparatus 3 can allocate one radio resource of one physical uplink shared channel for each uplink component frequency band in the same uplink subframe, with respect to one A-EUTRA-compliant mobile station apparatus 5. It should be noted that, the base station apparatus 3 cannot allocate the radio resources of a plurality of physical uplink shared channels within the same uplink component frequency band in the same uplink subframe, with respect to one A-EUTRA-compliant mobile station apparatus 5, but can allocates the radio resource of each physical uplink shared channel to a different uplink component frequency band.

The uplink pilot channel is composed of an uplink pilot channel for demodulation used in estimation of the channel variation in a physical uplink control channel and in a physical uplink shared channel and an uplink pilot channel for reference used in frequency scheduling of a physical uplink shared channel of the base station apparatus 3. It should be noted that the uplink pilot channel for reference is used also for measurement of a deviation of synchronization between the base station apparatus 3 and the mobile station apparatus 5.

A reference signal (referred to as an uplink reference signal) is arranged in an SC-FDMA symbol that differs between a case where the uplink pilot channel for demodulation is arranged within the same uplink resource block as a physical uplink shared channel and a case where the uplink pilot channel for demodulation is arranged within the same uplink resource block as a physical uplink control channel. Here, the uplink reference signal is used for an uplink pilot channel and is a known signal in the radio communication system 1.

When the uplink pilot channel for demodulation is arranged within the same uplink resource block as a physical uplink shared channel, an uplink reference signal is arranged in the fourth SC-FDMA symbol within an uplink slot (the uplink reference signal of the pilot channel for demodulation is referred to as a DeModulation Reference Signal DM RS). When the uplink pilot channel for demodulation is arranged within the same uplink resource block as a physical uplink control channel including the control data composed of a scheduling request, the demodulation reference signal is arranged in the third, the fourth, and the fifth SC-FDMA symbols within the uplink slot. When the demodulation reference signal is arranged within the same uplink resource block as the physical uplink control channel including the control data composed of reception confirmation response, the demodulation reference signal is arranged in the third, the fourth, and the fifth SC-FDMA symbols within the uplink slot. When arranged within the same uplink resource block as the physical uplink control channel including the control data composed of a channel quality indicator, the demodulation reference signal is arranged in the second and the sixth SC-FDMA symbols within an uplink slot.

The uplink pilot channel for reference is arranged within the uplink resource block the base station apparatus 3 determined, and an uplink reference signal (the uplink reference signal of the uplink pilot channel for reference is referred to as the Sounding Reference Signal SRS) is arranged in the fourteenth SC-FDMA symbol (the seventh SC-FDMA symbol of the second uplink slot of the uplink subframe) within the uplink subframe. The sounding reference signal is arranged only in the uplink subframe (referred to as the sounding reference subframe: SRS subframe) with a cycle which the base station apparatus 3 determined within a cell. The base station apparatus 3 allocates a cycle, at which the sounding reference signal is transmitted for each mobile station apparatus 5, and allocates an uplink resource block to the sounding reference signal subframe.

Although this Figure shows a case where a physical uplink control channel is arranged in the uplink resource block at the very end of each uplink component frequency band, an uplink resource block such as the second or the third uplink resource block from the end of an uplink component frequency band, may be used for the physical uplink control channel.

It should be noted that, in the radio communication system 1 according to the embodiment of the present invention, the OFDM scheme is applied in the downlink and the NxDFT-Spread OFDM scheme is applied in the uplink. Here, the NxDFT-Spread OFDM scheme is a scheme, in which the transmission/reception of a signal is carried out by using the DFT-Spread OFDM scheme in a unit of uplink component frequency band, and is a scheme, in which communications are carried out by using a plurality of processing units related to DFT-Spread OFDM transmission/reception in an uplink subframe of the radio communication system 1 using a plurality of uplink component frequency bands.

First Embodiment

Overall Configuration of the Base Station Apparatus 3

Figure 1:
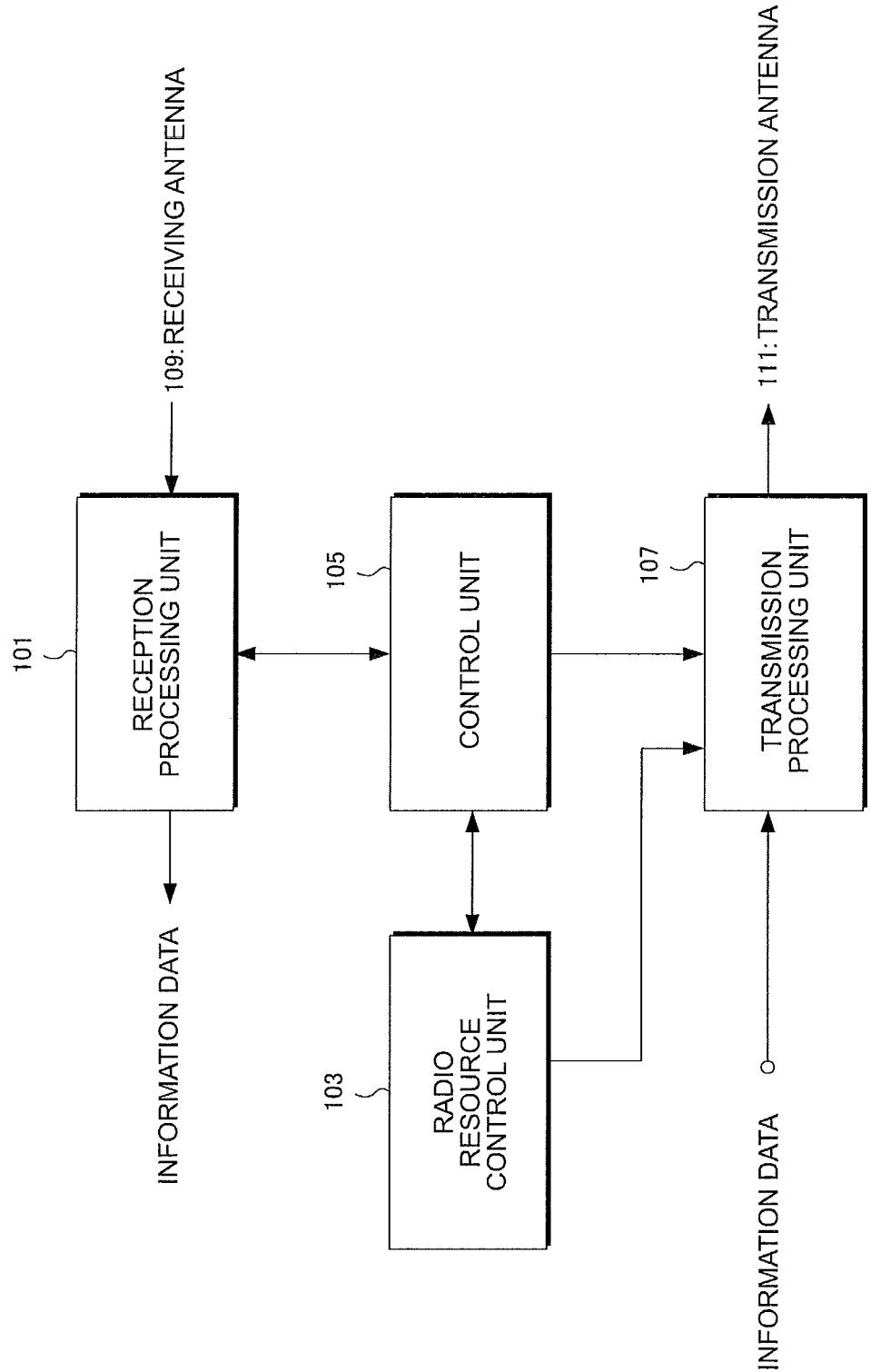
FIG. 1 is a schematic block diagram showing the configuration of a base station apparatus 3 according to an embodiment of the present invention.

Hereinafter, the configuration of the base station apparatus 3 according to the embodiment will be described using FIG. 1 and FIG. 2, FIG. 3. FIG. 1 is a schematic block diagram showing the configuration of the base station apparatus 3 according to the embodiment of the present invention. As shown in FIG. 1, the base station apparatus 3 includes a reception processing unit 101, a radio resource control unit 103, a control unit 105, and a transmission processing unit 107.

The reception processing unit 101, in accordance with an instruction of the control unit 105, demodulates the received signals of a physical uplink control channel and a physical uplink shared channel, which are received from the mobile station apparatus 5 by means of a receiving antenna 109, using the uplink reference signal of the pilot channel for demodulation and decodes the resultant signals to extract control data and information data. Moreover, the reception processing unit 101 measures the channel quality of one or more uplink resource blocks using the sounding reference signal received from the mobile station apparatus 5. The reception processing unit 101 carries out processing of extracting control data or processing of measuring the channel quality, with respect to an uplink subframe and an uplink resource block, in which the base station apparatus device 3 allocated the radio resource of a physical uplink control channel or a sounding reference signal to the mobile station apparatus 5. The reception processing unit 101 is instructed from the control unit 105 about what kind of processing is carried out to which uplink subframe and which uplink resource block. The reception processing unit 101 outputs the extracted control data and the measured channel quality to the control unit 105, and outputs information data to an higher layer. The detail of the reception processing unit 101 will be described later.

The radio resource control unit 103 sets a radio resource allocation (a transmission period, an uplink resource block) of a sounding reference signal, the cycle and the transmit power of a sounding reference signal subframe, a radio resource allocation of a physical downlink control channel, a radio resource allocation of a physical uplink control channel, a radio resource allocation of a physical downlink shared channel, a radio resource allocation of a physical uplink shared channel, the modulation schemes and the coding rates of various channels, and the like of the respective mobile station apparatuses 5. Moreover, the radio resource control unit 103, based on the control data which is obtained using a physical uplink control channel in the reception processing unit 101 and is input via the control unit 105, sets the radio resource allocation and the like for the physical uplink shared channel. For example, the radio resource control unit 103, when a scheduling request is input as the control data, allocates the radio resource of a physical uplink shared channel to the mobile station apparatus 5 that has transmitted the scheduling request. Moreover, the radio resource control unit 103 determines whether the first format is used or the second format is used for the format of a physical uplink control channel signal of a sounding reference signal subframe of each uplink component frequency band.

The radio resource control unit 103 sets the radio resource allocation of a physical uplink shared channel, the value of transmit power, and the like based on the channel quality of the uplink input through the control unit 105. For example, the radio resource control unit 103 allocates the radio resource for a physical uplink shared channel to an uplink resource block having a good channel quality with respect to the mobile station apparatus 5, or sets the value of transmit power based on the channel quality so that a received signal can achieve a predetermined error rate. Moreover, the radio resource control unit 103 controls the simultaneous transmission of the signals with different uplink component frequency bands based on the information related to the remaining transmit power capable of transmission, notification of which the mobile station apparatus 5 provides. When the remaining transmit power capable of transmission is large, the simultaneous transmission of the signals with different uplink component frequency bands is permitted for the mobile station apparatus 5, while when the remaining transmit power capable of transmission is small, the simultaneous transmission of the signals with different uplink component frequency bands is prohibited for the mobile station apparatus 5.

The radio resource control unit 103 outputs various control information to the control unit 105. The examples of the control information include: control information indicating whether the first format is used or the second format is used for the format of a physical uplink control channel signal in a sounding reference signal subframe, control information indicative of the radio resource allocation of a sounding reference signal, control information indicative of the radio resource allocation of a physical uplink control channel, control information indicative of the cycle of a sounding reference signal subframe, and control information indicating whether the simultaneous transmission of the signals with different uplink component frequency bands is permitted or prohibited.

The control unit 105, based on the control information input from the radio resource control unit 103, carries out the control of the radio resource allocation, modulation scheme, and coding rate of a physical downlink shared channel and a physical downlink control channel with respect to the transmission processing unit 107. Moreover, the control unit 105, based on the control information, generates the control data, which is transmitted using a physical downlink control channel, and outputs the same to the transmission processing unit 107. Moreover, the control unit 105 performs control so as to transmit the control information indicative of the radio resource allocation of a sounding reference signal, the control information indicative of the cycle of a sounding reference signal subframe, the control information indicative of the radio resource allocation of a physical uplink control channel, the control information indicating whether the first format is used or the second format is used for the format of the physical uplink control channel signal of the sounding reference signal subframe of each uplink component frequency band, and the like to the mobile station apparatus 5 via the transmission processing unit 107 by using a physical downlink shared channel.

The control unit 105, based on the control information input from the radio resource control unit 103, carries out the control of the radio resource allocation, modulation scheme, and coding rate of a physical uplink shared channel and a physical uplink control channel with respect to the reception processing unit 101. Moreover, the control unit 105, based on the control information input from the radio resource control unit 103, carries out the control of the measurement of channel quality using a sounding reference signal with respect to the reception processing unit 101. Moreover, the control unit 105 outputs the control data, which is transmitted by the mobile station apparatus 5 using a physical uplink control channel and is input via the reception processing unit 101, to the radio resource control unit 103.

The transmission processing unit 107, based on the control signal input from the control unit 105, generates a signal that is to be transmitted using a physical downlink control channel and a physical downlink shared channel, and transmits the same via the transmission antenna 111. The transmission processing unit 107 transmits the control information indicative of the radio resource allocation of a sounding reference signal, the control information being input from the radio resource control unit 103, the control information indicative of the cycle of a sounding reference signal subframe, the control information indicative of the radio resource allocation of a physical uplink control channel, the control information indicating whether the first format is used or the second format is used for the format of the physical uplink control channel signal of the sounding reference signal subframe of each uplink component frequency band, and information data input from an higher layer to the mobile station apparatus 5 by using a physical downlink shared channel, and transmits the control data input from the control unit 105 to the mobile station apparatus 5 by using a physical downlink control channel. It should be noted that, for simplicity of description, hereinafter, assume that the information data includes several kinds of control information. The detail of the transmission processing unit 107 will be described later.

<Configuration of the Transmission Processing Unit 107 of the Base Station Apparatus 3>

Hereinafter, the detail of the transmission processing unit 107 of the base station apparatus 3 will be described. FIG. 2 is a schematic block diagram showing the configuration of the transmission processing unit 107 of the base station apparatus 3 according to the embodiment of the present invention. As shown in FIG. 2, the transmission processing unit 107 includes a plurality of physical downlink shared channel processing units 201-1 to 201-M (hereinafter, the physical downlink shared channel processing units 201-1 to 201-M are collectively denoted as a physical downlink shared channel processing unit 201), a plurality of physical downlink control channel processing units 203-1 to 203-M (hereinafter, the physical downlink control channel processing units 203-1 to 203-M are collectively denoted as a physical downlink control channel processing unit 203), a downlink pilot channel processing unit 205, a multiplexing unit 207, an IFFT (Inverse Fast Fourier transformation) unit 209, a GI (Guard Interval) insertion unit 211, a D/A (Digital/Analog conversion) unit 213, an RF (Radio Frequency) transmission unit 215, and transmission antenna 111. It should be noted that, each physical downlink shared channel processing unit 201 and each physical downlink control channel processing unit 203 have the same configuration and function, respectively, and thus one of them will be described as the representative.

Figure 2:
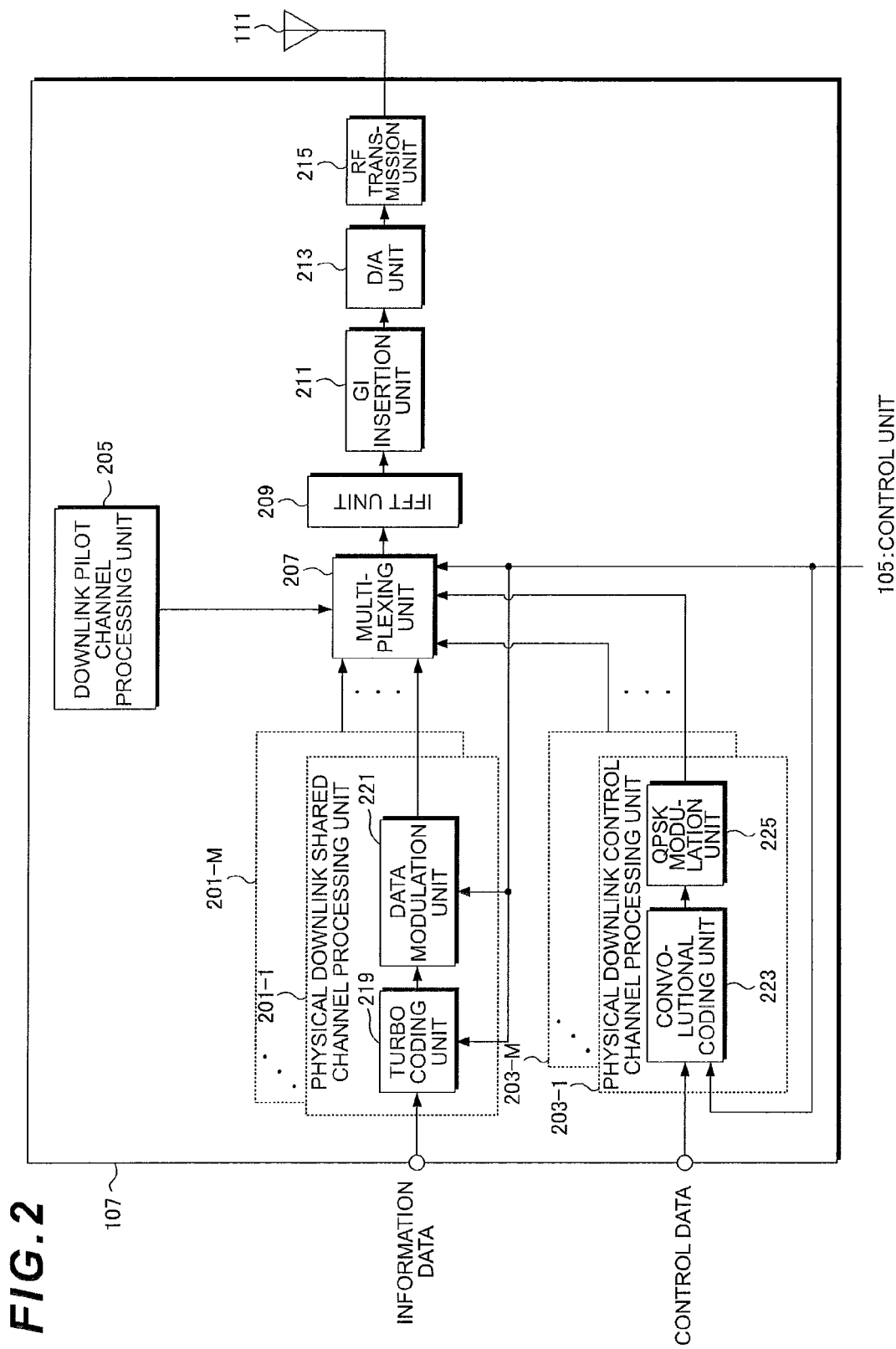
FIG. 2 is a schematic block diagram showing the configuration of a transmission processing unit 107 of the base station apparatus 3 according to the embodiment of the present invention.
Figure 3:
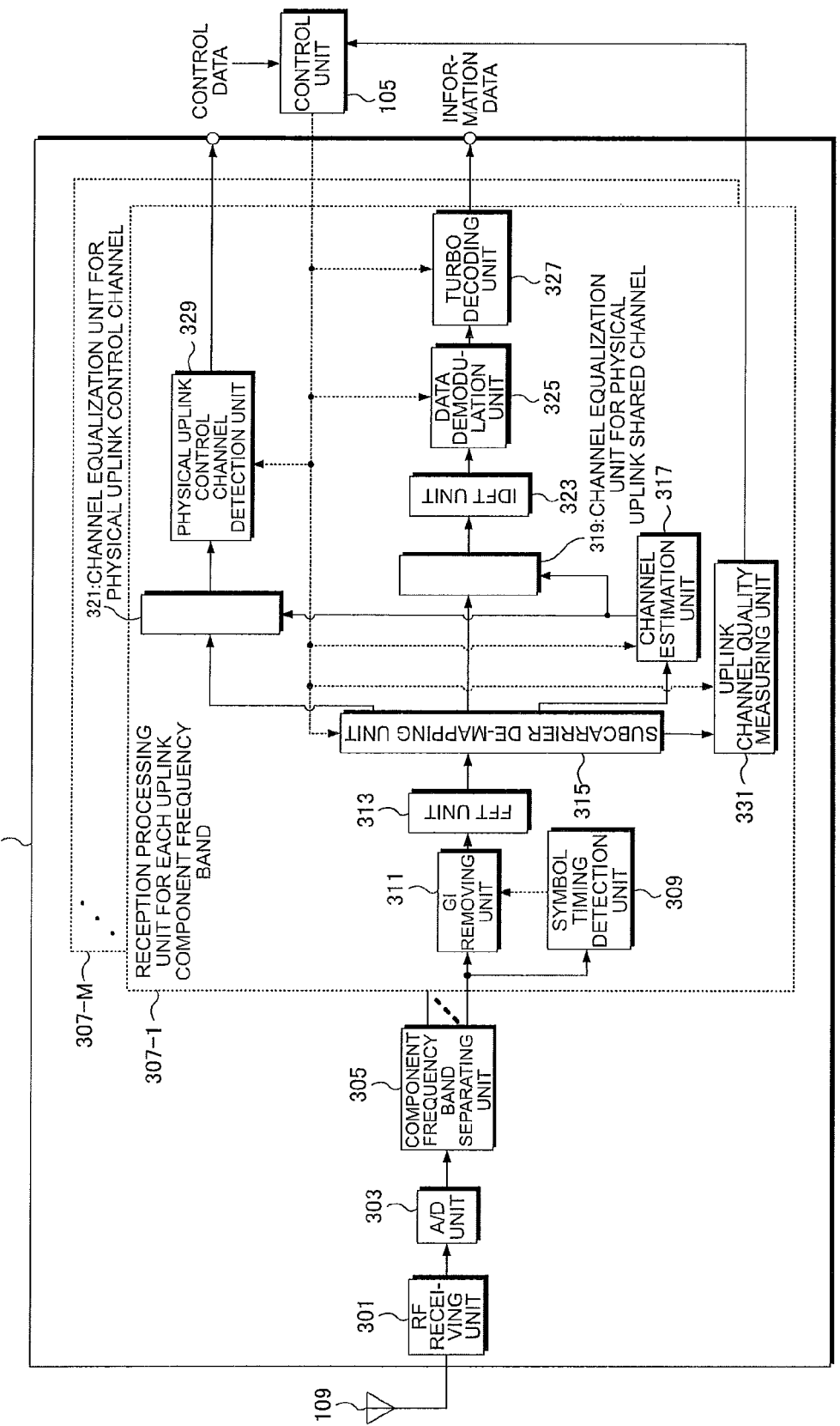
FIG. 3 is a schematic block diagram showing the configuration of a reception processing unit 101 of the base station apparatus 3 according to the embodiment of the present invention.

Moreover, as shown in FIG. 2, each physical downlink shared channel processing unit 201 includes a turbo coding unit 219 and a data modulation unit 221. Moreover, as shown in FIG. 2, the physical downlink control channel processing unit 203 includes a convolutional coding unit 223 and a QPSK modulation unit 225. The physical downlink shared channel processing unit 201 carries out a baseband signal processing for transmitting the information data directed to the mobile station apparatus 5 in the OFDM scheme. The turbo coding unit 219 carries out a turbo coding of the input information data for improving the error resilience of the data with a coding rate input from the control unit 105, and outputs the result to the data modulation unit 221. The data modulation unit 221 modulates the data, which is encoded by the turbo coding unit 219, in a modulation scheme input from the control unit 105, such as a modulation scheme of QPSK, 16QAM, 64QAM, or the like, and generates a signal sequence of modulation symbols. The data modulation unit 221 outputs the generated signal sequence to the multiplexing unit 207.

The physical downlink control channel processing unit 203 carries out a baseband signal processing for transmitting the control data, which is input from the control unit 105, in the OFDM scheme. A convolutional coding unit 223, based on the coding rate input from the control unit 105, carries out a convolutional coding for improving the error resilience of control data. Here, the control data is controlled bit-by-bit. Moreover, the convolutional coding unit 223, based on the coding rate input from the control unit 105, also carries out a rate matching on the convolutionally coded bits in order to adjust the number of output bits. The convolutional coding unit 223 outputs the coded control data to the QPSK modulation unit 225. The QPSK modulation unit 225 modulates the control data, which the convolutional coding unit 223 coded, in the QPSK modulation scheme and outputs a signal sequence of the modulated modulation symbols to the multiplexing unit 207. The downlink pilot channel processing unit 205 generates a downlink reference signal (referred to as also a Cell specific RS), which is a known signal in the mobile station apparatus 5, and outputs the same to the multiplexing unit 207.

The multiplexing unit 207 multiplexes a signal input from the physical downlink pilot channel processing unit 205, a signal input from each physical downlink shared channel processing unit 201, and a signal input from each physical downlink control channel processing unit 203 into a downlink radio frame in accordance with an instruction from the control unit 105. The control information related to the radio resource allocation of a physical downlink shared channel and the radio resource allocation of a physical downlink control channel set by the radio resource control unit 103 is input to the control unit 105, and based on this control information, the control unit 105 controls the processing of the multiplexing unit 207.

It should be noted that the multiplexing unit 207 carries out the multiplexing between a physical downlink shared channel and a physical downlink control channel in a time multiplexing manner as shown in FIG. 11. Moreover, the multiplexing unit 207 carries out the multiplexing between a downlink pilot channel and other channels in a time/frequency multiplexing manner. Moreover, the multiplexing unit 207 may carry out the multiplexing of the physical downlink shared channels directed to the respective mobile station apparatuses 5 in a unit of downlink resource block pair, and may multiplex the physical downlink shared channels with respect to one mobile station apparatus 5 by using a plurality of downlink resource block pairs. Moreover, the multiplexing unit 207 carries out the multiplexing of the physical downlink control channels directed to the respective mobile station apparatuses 5 by using a plurality of downlink resource elements dispersed within the same downlink component frequency band. The multiplexing unit 207 outputs the multiplexed signal to an IFFT unit 209.

The IFFT unit 209 performs the fast inverse Fourier transformation of the signal which the multiplexing unit 207 multiplexed, and performs the OFDM modulation, and outputs the result to the GI insertion unit 211. The GI insertion unit 211 generates a baseband digital signal including symbols in the OFDM scheme by adding a guard interval to the signal on which the IFFT unit 209 performed the OFDM modulation. As is well known, the guard interval is generated by copying the head or a part of the end of a symbol to transmit. The GI insertion unit 211 outputs the generated baseband digital signal to the D/A unit 213. The D/A unit 213 converts the baseband digital signal input from the GI insertion unit 211 to an analog signal, and outputs the same to an RF transmission unit 215. The RF transmission unit 215 generates an in-phase component and a quadrature-phase component of an intermediate frequency from the analog signal input from the D/A unit 213, and removes the frequency components redundant for the intermediate frequency band. Next, the RF transmission unit 215 converts (up-converts) the intermediate frequency signal to a high frequency signal, removes the redundant frequency components, amplifies electric power, and transmits the resultant signal to the mobile station apparatus 5 via the transmission antenna 111.

<Configuration of the Reception Processing Unit 101 of the Base Station Apparatus 3>

Hereinafter, the detail of the reception processing unit 101 of the base station apparatus 3 will be described. FIG. 3 is a schematic block diagram showing the configuration of the reception processing unit 101 of the base station apparatus 3 according to the embodiment of the present invention. As shown in FIG. 3, the reception processing unit 101 includes an RF receiving unit 301, an A/D (Analog/Digital conversion) unit 303, a component frequency band separating unit 305, a plurality of reception processing units for each uplink component frequency band 307-1 to 307-M (hereinafter, the reception processing units for each uplink component frequency band 307-1 to 307-M are denoted as a reception processing unit for each uplink component frequency band 307). Moreover, as shown in FIG. 3, the reception processing unit for each uplink component frequency band 307 includes a symbol timing detection unit 309, a GI removing unit 311, an FFT unit 313, a subcarrier demapping unit 315, a channel estimation unit 317, a channel equalizing unit 319 for physical uplink shared channels, a channel equalizing unit 321 for physical uplink control channels, an IDFT unit 323, a data demodulation unit 325, a turbo decoding unit 327, a physical uplink control channel detection unit 329, and an uplink channel quality measuring unit 331. It should be noted that each reception processing unit for each uplink component frequency band 307 has the same configuration and function, and thus one of them will be described as the representative.

The RF receiving unit 301 appropriately amplifies a signal received by the receiving antenna 109, converts (down-converts) this signal to an intermediate frequency, removes unnecessary frequency components, controls the amplification level so that the signal level is appropriately kept, and quadrature-demodulates the received signal based on the in-phase component and quadrature-phase component of the received signal. The RF receiving unit 301 outputs the quadrature-demodulated analog signal to the A/D unit 303. The A/D unit 303 converts the analog signal, which the RF receiving unit 301 quadrature-demodulated, to a digital signal and outputs the converted digital signal to the component frequency band separating unit 305. The component frequency band separating unit 305 separates the received signal for each uplink component frequency band of an uplink system bandwidth, and outputs the resultant signal to each reception processing unit for each uplink component frequency band 307.

The reception processing unit for each uplink component frequency band 307 carries out the demodulation and decoding of the physical uplink shared channel and the physical uplink control channel within an uplink component frequency band and detects information data and control data. Moreover, the reception processing unit for each uplink component frequency band 307 measures the channel quality of the uplink.

The symbol timing detection unit 309, based on the signal input from the component frequency band separating unit 305, detects the timing of a symbol, and outputs a control signal indicative of the timing of a boundary of the detected symbols to the GI removing unit 311. The GI removing unit 311, based on the control signal from the symbol timing detection unit 309, removes a portion corresponding to the guard interval from the signal input from the component frequency band separating unit 305, and outputs the remaining signal portion to the FFT unit 313. The FFT unit 313 performs the fast Fourier transformation of the signal input from the GI removing unit 311, performs DFT-Spread OFDM modulation, and outputs the result to the subcarrier demapping unit 315. It should be noted that, the number of FFT points of the FFT unit 313 is equal to the number of IFFT points of an IFFT unit of the mobile station apparatus 5 to be described later.

The subcarrier demapping unit 315, based on the control signal input from the control unit 105, separates the signal, which the FFT unit 313 demodulated, into uplink reference signals (a demodulation reference signal and a sounding reference signal) of the uplink pilot channels (an uplink pilot channel for demodulation and an uplink pilot channel for reference), a physical uplink shared channel signal, and a physical uplink control channel signal. The subcarrier demapping unit 315 outputs the separated demodulation reference signal to the channel estimation unit 317, outputs the separated physical uplink shared channel signal to the channel equalization unit for physical uplink shared channels 319, outputs the separated physical uplink control channel signal to the channel equalization unit for physical uplink control channels 321, and also outputs the separated sounding reference signal to the uplink channel quality measuring unit 331.

The channel estimation unit 317 estimates the variation in a channel using the demodulation reference signal, which the subcarrier demapping unit 315 separated, and a known signal. The channel estimation unit 317 outputs the estimated channel estimation value to the channel equalization unit for physical uplink shared channels 319 and the channel equalization unit for physical uplink control channels 321. The channel equalization unit for physical uplink shared channels 319, based on the channel estimation value input from the channel estimation unit 317, equalizes the amplitude and the phase of the physical uplink shared channel signal which the subcarrier demapping unit 315 separated. Here, "equalization" refers to the process of restoring the variation in a channel, which a signal experienced during radio communications. The channel equalization unit for physical uplink shared channels 319 outputs the adjusted signal to the IDFT unit 323.

The IDFT unit 323 performs the discrete inverse Fourier transformation of the signal input from the channel equalization unit for physical uplink shared channels 319, and outputs the result to the data demodulation unit 325. The data demodulation unit 325 demodulates the physical uplink shared channel signal which the IDFT unit 323 converted, and outputs the demodulated physical uplink shared channel signal to the turbo decoding unit 327. This demodulation is the demodulation compliant with a modulation scheme that is used in the data modulation unit of the mobile station apparatus 5, and the modulation scheme is input from the control unit 105. The turbo decoding unit 327 decodes information data from the physical uplink shared channel signal that is input from and demodulated by the data demodulation unit 325. The coding rate is input from the control unit 105.

The channel equalization unit for physical uplink control channels 321 equalizes the amplitude and the phase of a physical uplink control channel signal that is separated in the subcarrier demapping unit 315, based on the channel estimation value input from the channel estimation unit 317. The channel equalization unit for physical uplink control channels 321 outputs the equalized signal to the physical uplink control channel detection unit 329. The physical uplink control channel detection unit 329, in accordance with the transmitted control data (a scheduling request, a channel quality indicator, a reception confirmation response), demodulates and decodes the signal, which is input from the channel equalization unit for physical uplink control channels 321, and detects the control data. The physical uplink control channel detection unit 329 detects the signal in a radio resource that is allocated to the mobile station apparatus 5 in order to transmit a scheduling request. For example, the physical uplink control channel detection unit 329 multiplies an orthogonal sequence to the signal of an uplink resource block, which is allocated to the mobile station apparatus 5 in order to transmit a scheduling request, to combine a signal, and if the electric power of the combined signal is equal to or greater than a predetermined threshold value, the physical uplink control channel detection unit 329 determines that a scheduling request signal from the mobile station apparatus 5 has been detected.

It should be noted that the physical uplink control channel detection unit 329 makes use of the same orthogonal sequence as the orthogonal sequence multiplied in the mobile station apparatus 5. The physical uplink control channel detection unit 329, when having detected a scheduling request signal, generates a control signal indicative of having detected the scheduling request, and outputs the same to the control unit 105. In contrast, if the electric power of the combined signal is less than a predetermined threshold value, the physical uplink control channel detection unit 329 determines that a scheduling request signal from the mobile station apparatus 5 has not been detected. In this case, the physical uplink control channel detection unit 329 generates a control signal indicative of not having detected a scheduling request, and outputs the same to the control unit 105. Moreover, the physical uplink control channel detection unit 329 performs demodulation and decoding on a signal of an uplink resource block, which is allocated to the mobile station apparatus 5 in order to transmit a channel quality indicator and a reception confirmation response and is equalized in the channel equalization unit for physical uplink control channels 321, and detects the channel quality indicator and the reception confirmation response. The physical uplink control channel detection unit 329 outputs the detected control data to the control unit 105.

The uplink channel quality measuring unit 331 measures the channel quality by using a sounding reference signal input from the subcarrier demapping unit 315, and outputs the measurement result of the channel quality of the uplink resource block to the control unit 105. The uplink channel quality measuring unit 331 is indicated by the control unit 105 about on a signal of which uplink resource block of which uplink subframe to perform the measurement of the channel quality of the mobile station apparatus 5.

The control unit 105, based on the control data which the base station apparatus 3 transmitted using a physical downlink control channel to the mobile station apparatus 5 and the control information which it transmitted using a physical downlink shared channel, controls the subcarrier demapping unit 315, the data demodulation unit 325, the turbo decoding unit 327, the channel estimation unit 317, the physical uplink control channel detection unit 329, and the uplink channel quality measuring unit 331. Moreover, the control unit 105, based on the control data and the control information which the base station apparatus 3 transmitted to the mobile station apparatus 5, knows in which radio resource (uplink resource block), the physical uplink shared channel, the physical uplink control channel, and the sounding reference signal, which each mobile station apparatus 5 transmitted, are arranged.

<Overall Configuration of the Mobile Station Apparatus 5>

Figure 4:
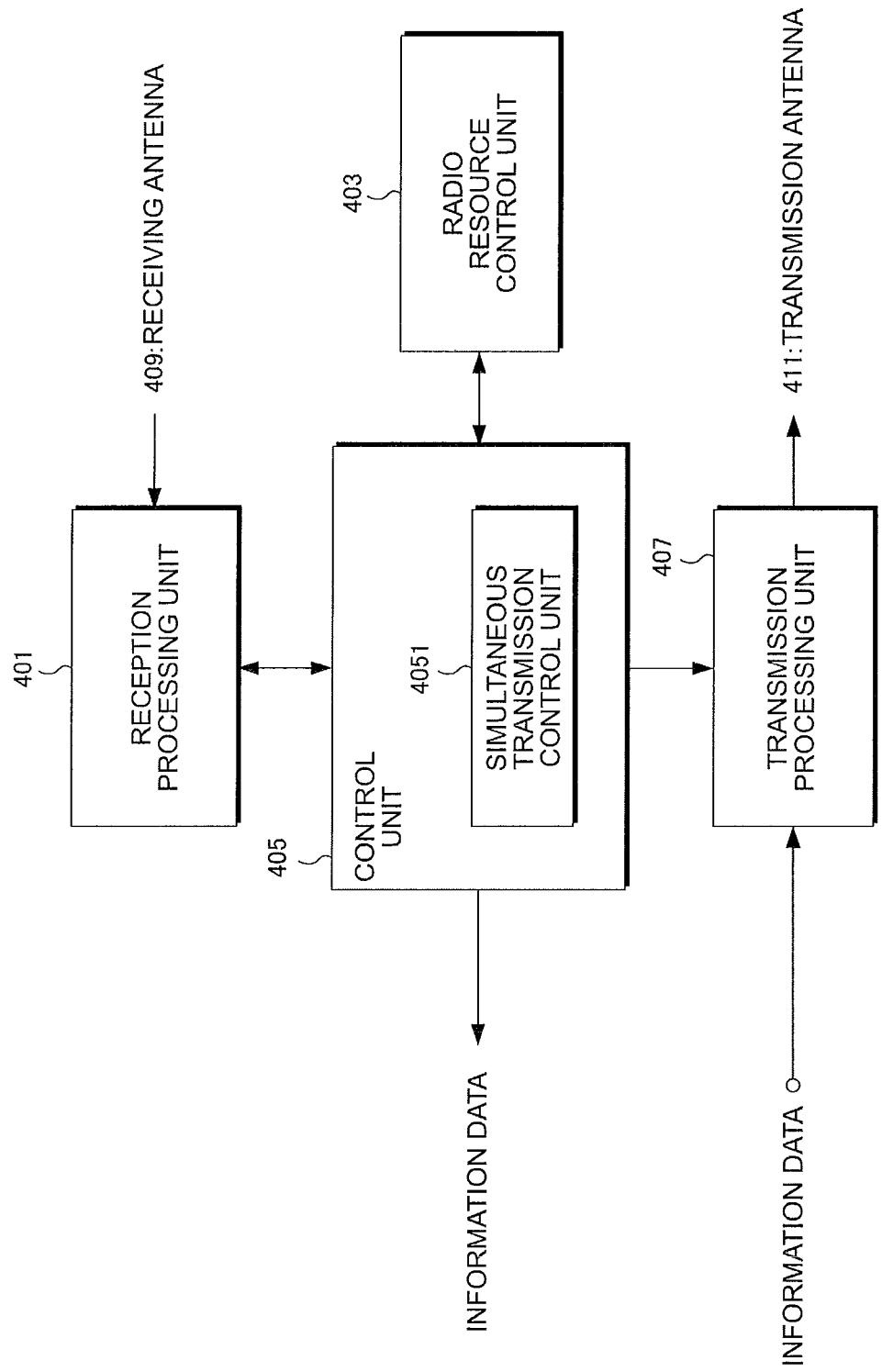
FIG. 4 is a schematic block diagram showing the configuration of a mobile station apparatus 5 according to the embodiment of the present invention.
Figure 5:
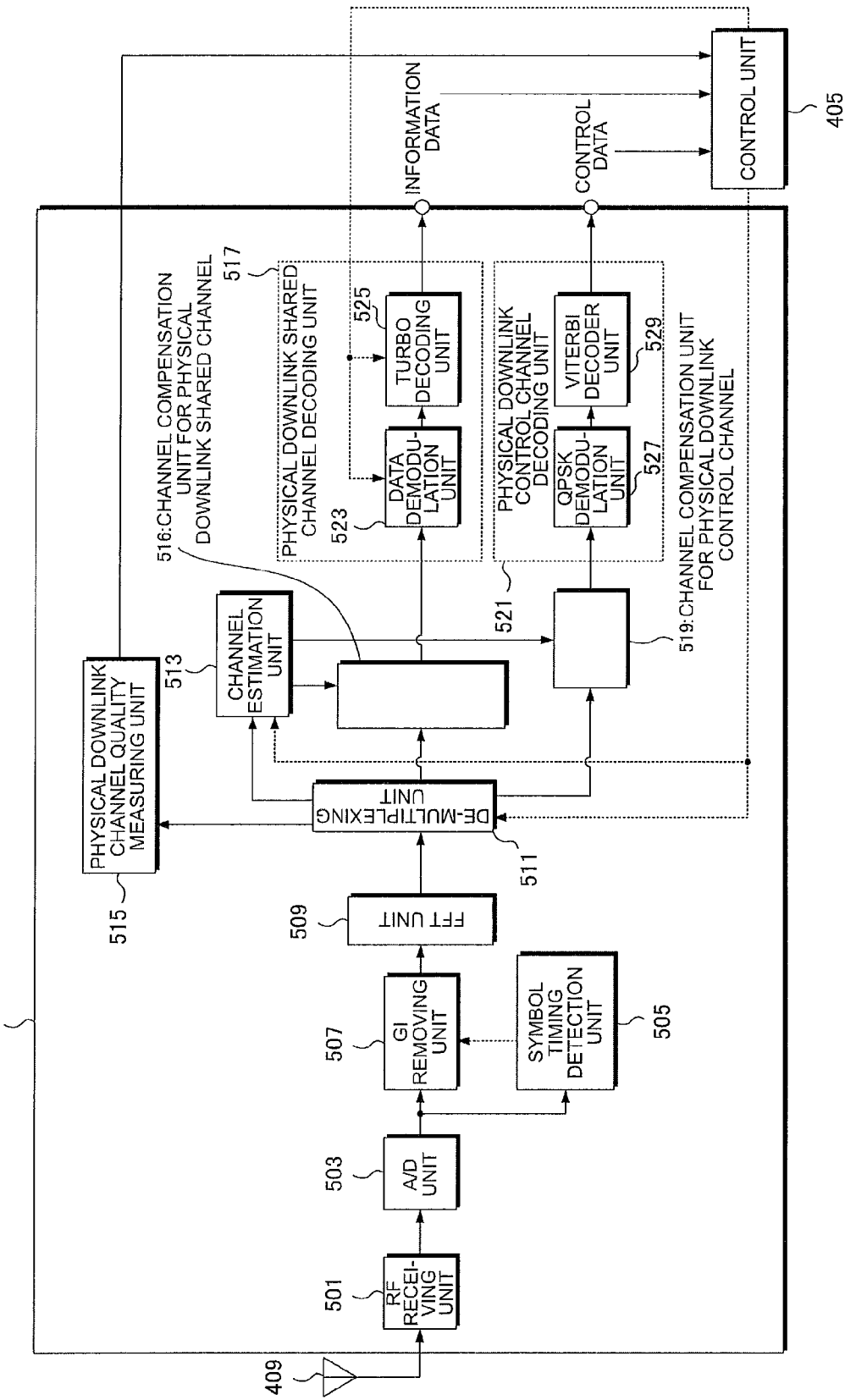
FIG. 5 is a schematic block diagram showing the configuration of a reception processing unit 401 of the mobile station apparatus 5 according to the embodiment of the present invention.

Hereinafter, the configuration of the mobile station apparatus 5 according to the embodiment will be described using FIG. 4, FIG. 5, and FIG. 6. FIG. 4 is a schematic block diagram showing the configuration of the mobile station apparatus 5 according to the embodiment of the present invention. As shown in FIG. 4, the mobile station apparatus 5 includes the reception processing unit 401, the radio resource control unit 403, the control unit 405, and the transmission processing unit 407. Moreover, the control unit 405 includes a simultaneous transmission control unit 4051.

The reception processing unit 401 receives a signal from the base station apparatus 3, and demodulates and decodes the received signal in accordance with an instruction of the control unit 405. The reception processing unit 401, when having detected the physical downlink control channel signal addressed to its own apparatus, outputs the control data obtained by decoding the physical downlink control channel signal, to the control unit 405. Moreover, the reception processing unit 401, in accordance with an instruction of the control unit 405 after outputting the control data included in a physical downlink control channel to the control unit 405, outputs the information data obtained by decoding a physical downlink shared channel addressed to its own apparatus, to an higher layer via the control unit 405. Moreover, the reception processing unit 401 outputs the control information obtained by decoding a physical downlink shared channel, the control information being generated by the radio resource control unit 103 of the base station apparatus 3, to the control unit 405, and outputs the same to the radio resource control unit 403 of the mobile station apparatus 5 via the control unit 405.

The examples of the control information generated by the radio resource control unit 103 of the base station apparatus 3 include the control information indicative of the radio resource allocation of a sounding reference signal, the control information indicative of the cycle of a sounding reference signal subframe, the control information indicative of the radio resource allocation of a physical uplink control channel, and the control information indicating whether the first format is used or the second format is used for the format of the physical uplink control channel signal of the sounding reference signal subframe of each uplink component frequency band. Moreover, the reception processing unit 401 measures the channel quality of a downlink using the downlink reference signal of the downlink pilot channel of each downlink component frequency band, and outputs the measurement result to the control unit 405. The detail of the reception processing unit 401 will be described later.

The control unit 405 includes the simultaneous transmission control unit 4051. The control unit 405 confirms the data, which has been transmitted using a physical downlink shared channel and input from the reception processing unit 401, outputs the information data within the data to an higher layer, and controls the reception processing unit 401 and the transmission processing unit 407 based on the control information, which is generated by the radio resource control unit 103 of the base station apparatus 3, within the data. Moreover, similarly, the control unit 405, based on the control data that has been transmitted using a physical downlink control channel and input by the reception processing unit 401, controls the reception processing unit 401 and the transmission processing unit 407.

The simultaneous transmission control unit 4051, when the radio resources of a sounding reference signal and a physical uplink control channel have been set in the same uplink subframe (time frame) by the base station apparatus 3, controls the transmission processing of the sounding reference signal and the physical uplink control channel signal according to whether each radio resource is set in the same uplink component frequency band or each radio resource is set in a different uplink component frequency band, and outputs a control signal to the transmission processing unit 407. Moreover, the simultaneous transmission control unit 4051, in accordance with the format of a physical uplink control channel signal that is used in order to transmit a scheduling request in the sounding reference signal subframe of each uplink component frequency band, controls the transmission processing of the sounding reference signal and the physical uplink control channel signal. The format is composed of a first format, in which a radio resource of the time domain, to which the radio resource of a sounding reference signal may be allocated, is used or a second format, in which the radio resource of the time domain, to which the radio resource of a sounding reference signal may be allocated, is not used.

The simultaneous transmission control unit 4051, when the format of the sounding reference signal subframe of a physical uplink control channel signal is the first format and the radio resources of a sounding reference signal and a physical uplink control channel have been simultaneously set to the same uplink component frequency band in the radio resource control unit 403, performs control so as to transmit the physical uplink control channel signal without transmitting the sounding reference signal in the transmission processing unit 407, and when the format of the sounding reference signal subframe of a physical uplink control channel signal is the first format and the radio resources of a sounding reference signal and a physical uplink control channel have simultaneously been set to a different uplink component frequency band, respectively, in the radio resource control unit 403, the simultaneous transmission control unit 4051 performs control so as to simultaneously transmit the sounding reference signal and the physical uplink control channel signal in the transmission processing unit 407.

It should be noted that, in the case where the simultaneous transmission of the signals with different uplink component frequency bands is prohibited by the base station apparatus 3, the simultaneous transmission control unit 4051, even when the radio resources of a sounding reference signal and a physical uplink control channel have simultaneously been set to a different uplink component frequency band, respectively, in the radio resource control unit 403, may perform control so as to transmit the physical uplink control channel signal without transmitting the sounding reference signal in the transmission processing unit 407. The base station apparatus 3 controls the simultaneous transmission of the signals with different uplink component frequency bands based on the information related to the remaining transmit power capable of transmission, notification of which the mobile station apparatus 5 provides, and when the remaining transmit power capable of transmission is large, the simultaneous transmission of the signals with different uplink component frequency bands is permitted, while when the remaining transmit power capable of transmission is small, the simultaneous transmission of the signals with different uplink component frequency bands is prohibited.

The simultaneous transmission control unit 4051, when the format of the sounding reference signal subframe of a physical uplink control channel signal is the second format and the radio resources of the sounding reference signal and the physical uplink control channel have simultaneously been set to the same uplink component frequency band in the radio resource control unit 403, performs control so as to simultaneously transmit the sounding reference signal and the physical uplink control channel signal in the transmission processing unit 407. In contrast, when the format of the sounding reference signal subframe of the physical uplink control channel signal is the second format and the radio resources of the sounding reference signal and the physical uplink control channel have simultaneously been set to a different uplink component frequency band, respectively, in the radio resource control unit 403, the simultaneous transmission control unit 4051 performs control so as to simultaneously transmit the sounding reference signal and the physical uplink control channel signal in the transmission processing unit 407.

It should be noted that, even in the case where the simultaneous transmission of the signals with different uplink component frequency bands is basically prohibited by the base station apparatus 3, the simultaneous transmission control unit 4051, when the format of a physical uplink control channel signal is the second format and the radio resources of the sounding reference signal and the physical uplink control channel have simultaneously been set to a different uplink component frequency band, respectively, in the radio resource control unit 403, performs control so as to simultaneously transmit the sounding reference signal and the physical uplink control channel signal in the transmission processing unit 407.

Moreover, the simultaneous transmission control unit 4051, when the format of the sounding reference signal subframe of a physical uplink control channel signal is the first format and the radio resources of the sounding reference signal and the physical uplink control channel have simultaneously been set to a different uplink component frequency band, respectively, in the radio resource control unit 403, performs control so as to transmit the physical uplink control channel signal without transmitting the sounding reference signal in the transmission processing unit 407. In contrast, when the format of the sounding reference signal subframe of the physical uplink control channel signal is the second format and the radio resources of the sounding reference signal and the physical uplink control channel have simultaneously been set to a different uplink component frequency band, respectively, in the radio resource control unit 403, the simultaneous transmission control unit 4051 performs control so as to simultaneously transmit the sounding reference signal and the physical uplink control channel signal in the transmission processing unit 407.

That is, the simultaneous transmission control unit 4051, when the simultaneous transmission of the signals with different uplink component frequency bands is basically prohibited by the base station apparatus 3, controls the transmission processing of a sounding reference signal and a physical uplink control channel signal in accordance with the format of the physical uplink control channel, and in the case of the first format, the simultaneous transmission control unit 4051 performs control so as to transmit the physical uplink control channel signal without transmitting the sounding reference signal in the transmission processing unit 407, while in the case of the second format, the simultaneous transmission control unit 4051 performs control so as to simultaneously transmit the sounding reference signal and the physical uplink control channel signal in the transmission processing unit 407. The control unit 405 controls the transmission processing unit 407 so as to transmit a sounding reference signal and a physical uplink control channel signal based on the control of the simultaneous transmission control unit 4051.

The radio resource control unit 403 controls the reception processing unit 401 and the transmission processing unit 407 via the control unit 405 while holding the control information which is generated by the radio resource control unit 103 of the base station apparatus 3 and notification of which the base station apparatus 3 provides. For example, the radio resource control unit 403 outputs, to the control unit 405, the control signal related to a radio resource allocation (a transmission period, an uplink resource block) of a sounding reference signal; the transmit power of a physical uplink shared channel, a physical uplink control channel, and an uplink pilot channel; the radio resource allocation of a physical uplink control channel; and the format used for the physical uplink control channel signal of each uplink component frequency band.

Moreover, the radio resource control unit 403 determines whether or not to transmit a signal indicative of a scheduling request using a radio resource that is allocated from the base station apparatus 3, and when it is determined that the signal indicative of a scheduling request is transmitted, the radio resource control unit 403 outputs a control signal indicative of that effect to the control unit 405, and controls the transmission processing unit 407 so as to transmit the signal using a physical uplink control channel.

The transmission processing unit 407 encodes the information data and the control data in accordance with an instruction of the control unit 405, and arranges the modulated signal into the radio resources of a physical uplink shared channel and a physical uplink control channel, and transmits the same to the base station apparatus 3 via the transmission antenna 411. Furthermore, the transmission processing unit 407 transmits a sounding reference signal in accordance with an instruction of the control unit 405. The detail of the transmission processing unit 407 will be described later. It should be noted that, as the radio resource allocation of a physical uplink control channel for transmission of a scheduling request, an uplink resource block of a periodic uplink subframe is allocated to the mobile station apparatus 5.

<Reception Processing Unit 401 of the Mobile Station Apparatus 5>

Hereinafter, the detail of the reception processing unit 401 of the mobile station apparatus 5 will be described. FIG. 5 is a schematic block diagram showing the configuration of the reception processing unit 401 of the mobile station apparatus 5 according to the embodiment of the present invention. As shown in FIG. 5, the reception processing unit 401 includes an RF receiving unit 501, an A/D unit 503, a symbol timing detection unit 505, a GI removing unit 507, an FFT unit 509, a de-multiplexing unit 511, a channel estimation unit 513, a downlink channel quality measuring unit 515, a channel compensation unit 516 for physical downlink shared channels, a physical downlink shared channel decoding unit 517, a channel compensation unit 519 for physical downlink control channels, and a physical downlink control channel decoding unit 521. Furthermore, as shown in FIG. 5, the physical downlink shared channel decoding unit 517 includes a data demodulation unit 523 and a turbo decoding unit 525. Moreover, as shown in FIG. 5, the physical downlink control channel decoding unit 521 includes a QPSK demodulation unit 527 and a Viterbi decoder unit 529.

The RF receiving unit 501 appropriately amplifies a signal received by the receiving antenna 409, converts (down-converts) the same to an intermediate frequency, removes unnecessary frequency components, and controls the amplification level so that the signal level is appropriately maintained, and quadrature-demodulates the received signal based on the in-phase component and quadrature-phase component of the received signal. The RF receiving unit 501 outputs the quadrature-demodulated analog signal to the A/D unit 503.

The A/D unit 503 converts the analog signal, which the RF receiving unit 501 quadrature-demodulated, to a digital signal, and outputs the converted digital signal to the symbol timing detection unit 505 and the GI removing unit 507. The symbol timing detection unit 505, based on the digital signal which the A/D unit 503 converted, detects the timing of a symbol and outputs a control signal indicative of the timing of a symbol boundary to the GI removing unit 507. The GI removing unit 507, based on a control signal from the symbol timing detection unit 505, removes a portion corresponding to the guard interval from the digital signal which the A/D unit 503 output, and outputs the remaining signal portion to the FFT unit 509. The FFT unit 509 performs fast Fourier transformation of the signal input from the GI removing unit 507, performs OFDM modulation, and outputs the result to the de-multiplexing unit 511.

The de-multiplexing unit 511, based on the control signal input from the control unit 405, separates a signal which the FFT unit 509 demodulated, to a physical downlink control channel signal and a physical downlink shared channel signal. The de-multiplexing unit 511 outputs the separated physical downlink shared channel signal to the channel compensation unit 516 for physical downlink shared channels, and also outputs the separated physical downlink control channel signal to the channel compensation unit 519 for physical downlink control channels. Moreover, the de-multiplexing unit 511 separates a downlink resource element in which a downlink pilot channel is arranged, and outputs a downlink reference signal of the downlink pilot channel to the channel estimation unit 513 and the downlink channel quality measuring unit 515.

The channel estimation unit 513 outputs a channel compensation value for adjusting the amplitude and the phase to the channel compensation unit 516 for physical downlink shared channels and the channel compensation unit 519 for physical downlink control channels so as to estimate a variation in the channel and compensate the same by using the downlink reference signal of the downlink pilot channel, which the de-multiplexing unit 511 separated, and a known signal. The downlink channel quality measuring unit 515 measures the channel quality of the downlink using the downlink reference signal of the downlink pilot channel, and outputs the measurement result of the channel quality of the downlink to the control unit 405. The channel compensation unit 516 for physical downlink shared channels adjusts the amplitude and the phase of the physical downlink shared channel signal, which the de-multiplexing unit 511 separated, in accordance with the channel compensation value input from the channel estimation unit 513. The channel compensation unit 516 for physical downlink shared channels outputs a signal, the channel of which is adjusted, to the data demodulation unit 523 of the physical downlink shared channel decoding unit 517.

The physical downlink shared channel decoding unit 517, based on an instruction from the control unit 405, carries out the demodulation and decoding of the physical downlink shared channel, and detects information data. The data demodulation unit 523 demodulates a physical downlink shared channel signal input from the channel compensation unit 516, and outputs the demodulated physical downlink shared channel signal to the turbo decoding unit 525. This demodulation is the demodulation compliant with the modulation scheme used in the data modulation unit 221 of the base station apparatus 3. The turbo decoding unit 525 decodes the information data from the physical downlink shared channel signal that is input from the data demodulation unit 523 and is demodulated, and outputs the information data to an higher layer via the control unit 405. It should be noted that, control information that is transmitted using a physical downlink shared channel, the control information being generated by the radio resource control unit 103 of the base station apparatus 3, is also output to the control unit 405, and is output also to the radio resource control unit 403 via the control unit 405.

The channel compensation unit 519 for physical downlink control channels adjusts the amplitude and the phase of the physical downlink control channel signal which the de-multiplexing unit 511 separated, in accordance with the channel compensation value input from the channel estimation unit 513. The channel compensation unit 519 for physical downlink control channels outputs the adjusted signal to the QPSK demodulation unit 527 of the physical downlink control channel decoding unit 521.

The physical downlink control channel decoding unit 521 demodulates and decodes a signal input from the channel compensation unit 519 for physical downlink control channels, and detects the control data, as follows. The QPSK demodulation unit 527 performs QPSK demodulation on a physical downlink control channel signal, and outputs the result to the Viterbi decoder unit 529. The Viterbi decoder unit 529 decodes the signal which the QPSK demodulation unit 527 demodulated, and outputs the decoded control data to the control unit 405. Here, this signal is expressed bit-by-bit, and the Viterbi decoder unit 529 also performs a rate de-matching on input bits in order to adjust the number of bits on which the Viterbi decoding is performed.

It should be noted that, the control unit 405 determines whether or not the control data input from the Viterbi decoder unit 529 is correct and is the control data addressed to its own apparatus, and when it is determined that this control data is correct and is the control data addressed to its own apparatus, the control unit 405 controls the de-multiplexing unit 511, the data demodulation unit 523, the turbo decoding unit 525, and the transmission processing unit 407 based on the control data. For example, the control unit 405, when the control data includes information about a radio resource allocation of a physical uplink shared channel, performs control so as to transmit a physical uplink shared channel signal in an uplink component frequency band, to which a radio resource has been allocated, to the transmission processing unit 407.

<Transmission Processing Unit 407 of the Mobile Station Apparatus 5>

Figure 6:
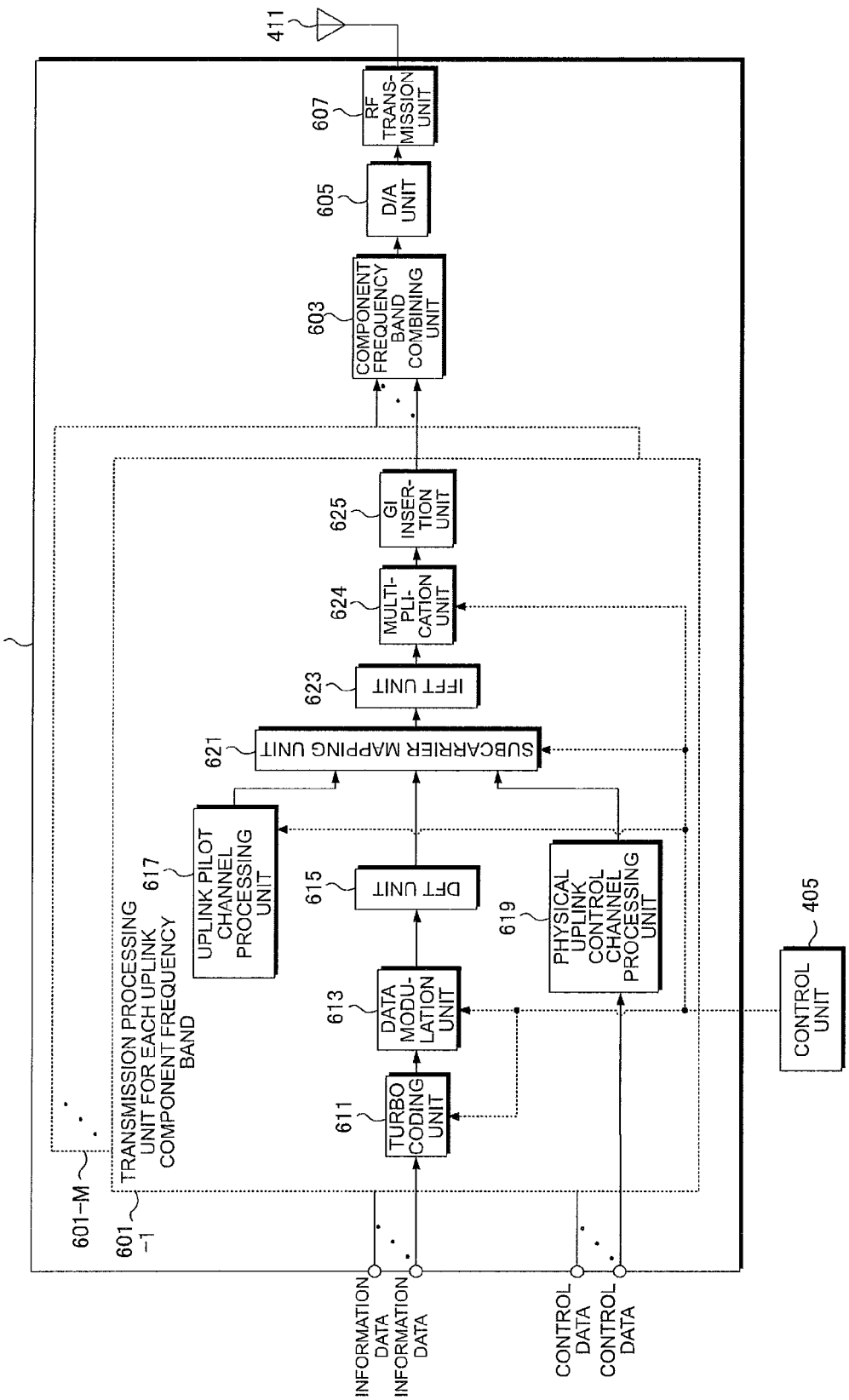
FIG. 6 is a schematic block diagram showing the configuration of a transmission processing unit 407 of the mobile station apparatus 5 according to the embodiment of the present invention.

FIG. 6 is a schematic block diagram showing the configuration of the transmission processing unit 407 of the mobile station apparatus 5 according to the embodiment of the present invention. As shown in FIG. 6, the transmission processing unit 407 includes a plurality of transmission processing units for each uplink component frequency band 601-1 to 601-M (hereinafter, the transmission processing units for each uplink component frequency band 601-1 to 601-M are collectively denoted as a transmission processing unit for each uplink component frequency band 601), a component frequency band combining unit 603, a D/A unit 605, an RF transmission unit 607, and a transmission antenna 411. Moreover, as shown in FIG. 6, the transmission processing unit for each uplink component frequency band 601 includes a turbo coding unit 611, a data modulation unit 613, a DFT unit 615, an uplink pilot channel processing unit 617, a physical uplink control channel processing unit 619, a subcarrier mapping unit 621, an IFFT unit 623, a multiplication unit 624, and a GI insertion unit 625. The mobile station apparatus 5 has the number of transmission processing units for each uplink component frequency band 601 corresponding to the number of uplink component frequency bands. It should be noted that, each transmission processing unit for each uplink component frequency band 601 has the same configuration and function, and thus one of them will be described as the representative.

The transmission processing unit for each uplink component frequency band 601 performs the encoding and modulation on information data and control data, and generates a signal to be transmitted using a physical uplink shared channel and a physical uplink control channel within an uplink component frequency band. Moreover, the transmission processing unit for each uplink component frequency band 601 generates a sounding reference signal and a demodulation reference signal to be transmitted using an uplink pilot channel. The turbo coding unit 611 carries out a turbo coding for improving the error resilience of data on the input information data with a coding rate indicated by the control unit 405, and outputs the resultant data to the data modulation unit 613. The data modulation unit 613 modulates the data that is encoded by the turbo coding unit 611, in a modulation scheme indicated by the control unit 405, such as a modulation scheme of QPSK, 16QAM, or 64QAM, and generates a signal sequence of modulation symbols. The data modulation unit 613 outputs the generated signal sequence of modulation symbol to the DFT unit 615.

The DFT unit 615 performs discrete Fourier transformation of the signal which the data modulation unit 613 output, and outputs the result to the subcarrier mapping part 621. The physical uplink control channel processing unit 619 performs a baseband signal processing for transmitting the control data input from the control unit 405. The control data input to the physical uplink control channel processing unit 619 includes a scheduling request, a channel quality indicator of a downlink, a reception confirmation response, and the like. The physical uplink control channel processing unit 619 performs a baseband signal processing and outputs the generated signal to the subcarrier mapping unit 621.

The uplink pilot channel processing unit 617, based on an instruction from the control unit 405, generates an uplink reference signal, which is a known signal in the base station apparatus 3, as a signal used for a demodulation reference signal and a sounding reference signal, and outputs the same to the subcarrier mapping unit 621.

The subcarrier mapping unit 621, in accordance with an instructions from the control unit 405, arranges a signal input from the uplink pilot channel processing unit 617, a signal input from the DFT unit 615, and a signal input from the physical uplink control channel processing unit 619 into a subcarrier, and outputs the same to the IFFT unit 623. It should be noted that, the subcarrier mapping unit 621 arranges a sounding reference signal, a demodulation reference signal within a physical uplink shared channel, and a demodulation reference signal within a physical uplink control channel as shown in FIG. 12, and outputs the arrangement result.

The IFFT unit 623 performs fast inverse Fourier transformation of a signal the subcarrier mapping unit 621 output, and outputs the result to the multiplication unit 624. Here, the number of IFFT points of the IFFT unit 623 is larger than the number of DFT points of the DFT unit 615. The mobile station apparatus 5, by using the DFT unit 615, the subcarrier mapping unit 621, and the IFFT unit 623, performs DFT-Spread OFDM modulation on a signal that is transmitted using a physical uplink shared channel. The multiplication unit 624 multiplies an orthogonal code in a unit of SC-FDMA symbol in accordance with an instruction from the control unit 405, and outputs the result to the GI insertion unit 625. Here, the control unit 405, with respect to a physical uplink control channel signal including the control data of a scheduling request, controls the multiplication unit 624 to multiply each orthogonal code of the orthogonal sequence as shown in FIG. 13 to a SC-FDMA symbol, while with respect to an physical uplink shared channel signal, a sounding reference signal, or a demodulation reference signal, the control unit 405 controls the multiplication unit 624 to output the input signal as is without multiplying anything. The GI insertion unit 625 adds a guard interval to the signal input from the multiplication unit 624, and outputs the result to the component frequency band combining unit 603.

The component frequency band combining unit 603 combines the signal for each uplink component frequency band input from each transmission processing unit for each uplink component frequency band 601, and outputs the result to the D/A unit 605. The D/A unit 605 converts a baseband digital signal input from the component frequency band combining unit 603 to an analog signal, and outputs the analog signal to the RF transmission unit 607. The RF transmission unit 607 generates an in-phase component and a quadrature-phase component of an intermediate frequency from the analog signal input from the D/A unit 605, and removes the frequency components redundant for the intermediate frequency band. Next, the RF transmission unit 607 converts (up-converts) the intermediate frequency signal to a high frequency signal, removes the redundant frequency components, amplifies electric power, and transmits the resultant signal to the base station apparatus 3 via the transmission antenna 411. With the above configuration, the transmission processing unit 407 transmits a sounding reference signal and a physical uplink control channel signal to the base station apparatus 3 based on the control of the control unit 405.

<Transmission Processing of a Sounding Reference Signal and a Physical Uplink Control Channel Signal>

Figure 7:
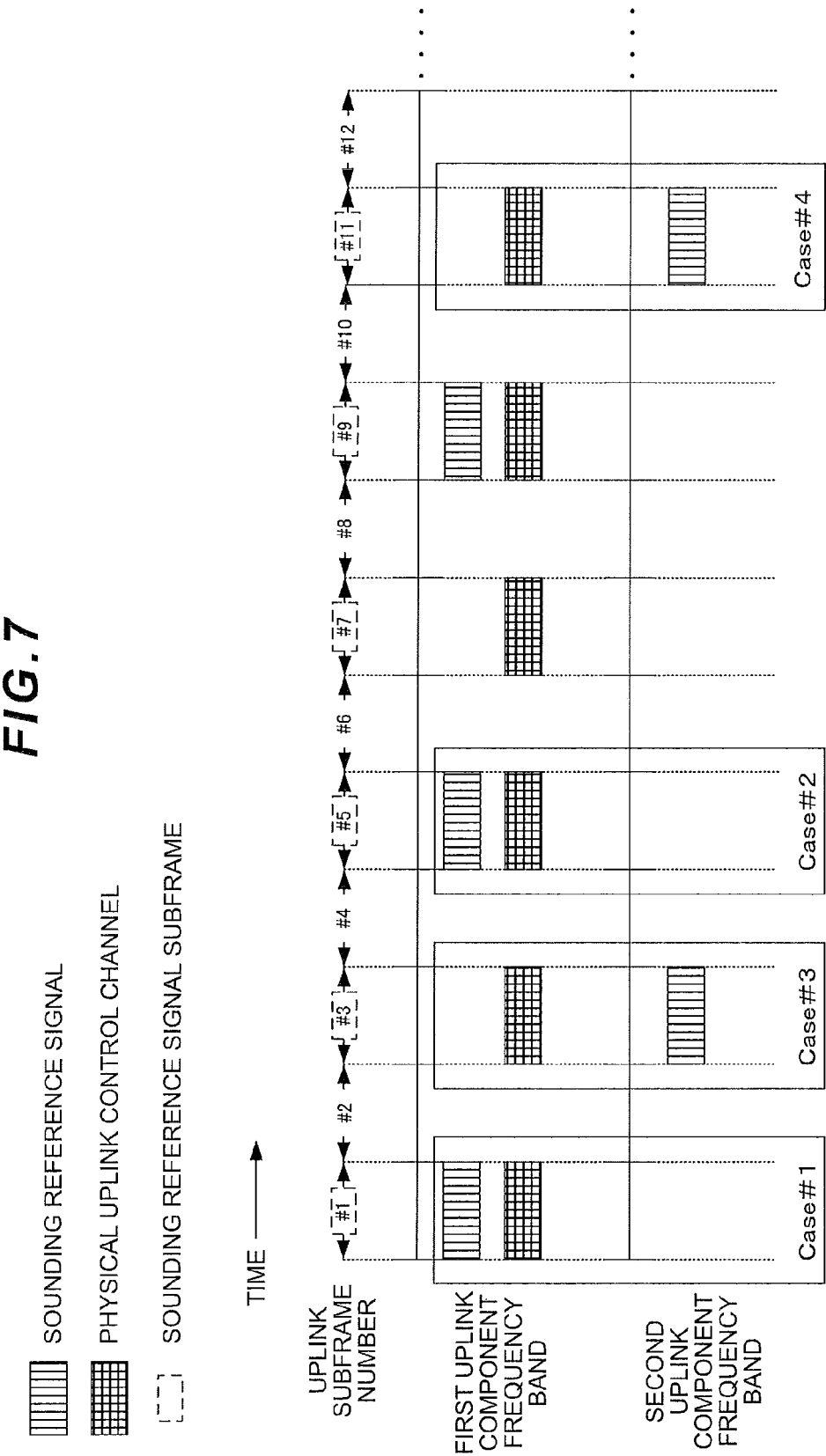
FIG. 7 is a diagram showing an example of a combination of radio resources set for a sounding reference signal and a physical uplink control channel signal in the embodiment of the present invention.

The transmission processing of a sounding reference signal and a physical uplink control channel signal will be described. A case will be described, where two uplink component frequency bands (a first uplink component frequency band and a second uplink component frequency band) are used. FIG. 7 is a diagram showing an example of a combination of radio resources set to a sounding reference signal and a physical uplink control channel signal in the embodiment of the present invention. A case will be described, where a sounding reference signal subframe is set for every two uplink subframes in the first uplink component frequency band and the second uplink component frequency band. Moreover, a case will be described, in which the first uplink component frequency band, the radio resource of a sounding reference signal is allocated for every two sounding reference signal subframes, and in the second uplink component frequency band, the radio resource of a sounding reference signal is allocated for every four sounding reference signal subframes. Moreover, a case will be described, where the radio resource of a physical uplink control channel signal has been allocated to the first uplink component frequency band for every two uplink subframes. Moreover, a case will be described, in which the first uplink component frequency band, the first format is set to the physical uplink control channel of the sounding reference signal subframe up to the uplink subframe #4, and the second format is set to the physical uplink control channel of the sounding reference signal subframe of the uplink subframe #5 and thereafter. It should be noted that the first format is already set to the physical uplink control channel of the uplink subframe that is not the sounding reference signal subframe.

First, a case will be described, where the radio resources of a sounding reference signal and a physical uplink control channel are set only to one of the uplink component frequency bands. A case will be described, where the physical uplink control channel of the first format is set in the sounding reference signal subframe of the first uplink component frequency band. The mobile station apparatus 5, when the radio resources of a sounding reference signal and a physical uplink control channel signal have been set to the same uplink subframe in the first uplink component frequency band (Case #1 of FIG. 7), transmits only the physical uplink control channel signal without transmitting the sounding reference signal.

A case will be described, where the physical uplink control channel of the second format is set in the sounding reference signal subframe of the first uplink component frequency band. The mobile station apparatus 5, when the radio resources of a sounding reference signal and a physical uplink control channel signal have been set to the same uplink subframe in the first uplink component frequency band (Case #2 of FIG. 7), simultaneously transmits the sounding reference signal and the physical uplink control channel signal.

Next, a case will be described, where the radio resources of a sounding reference signal and a physical uplink control channel are set to a different uplink component frequency band, respectively. A case will be described, where the physical uplink control channel of the first format is set in the sounding reference signal subframe of the first uplink component frequency band. The mobile station apparatus 5, when the radio resource of a sounding reference signal has been set in the same uplink subframe in the second uplink component frequency band, and the radio resource of a physical uplink control channel signal has been set in the first uplink component frequency band (Case #3 of FIG. 7), simultaneously transmits the sounding reference signal and the physical uplink control channel signal. It should be noted that, the mobile station apparatus 5 having a remaining small transmit power capable of transmission, based on an instruction from the base station apparatus 3, when the radio resources of a sounding reference signal and a physical uplink control channel signal have been set to the same uplink subframe with a different uplink component frequency band, transmits only the physical uplink control channel signal without transmitting the sounding reference signal.

A case will be described, where the physical uplink control channel of the second format is set in the sounding reference signal subframe of the first uplink component frequency band. The mobile station apparatus 5, when the radio resource of a sounding reference signal has been set in the same uplink subframe in the second uplink component frequency band, and the radio resource of a physical uplink control channel signal has been set in the first uplink component frequency band (Case #4 of FIG. 7), simultaneously transmits the sounding reference signal and the physical uplink control channel signal. It should be noted that, the mobile station apparatus 5, regardless of the remaining transmit power capable of transmission, when the radio resources of a sounding reference signal and a physical uplink control channel signal have been set to the same uplink subframe with a different uplink component frequency band and the format of the physical uplink control channel signal is the second format, simultaneously transmits the sounding reference signal and the physical uplink control channel signal.

It should be noted that, the mobile station apparatus 5, when a scheduling request is not transmitted in an uplink subframe to which the radio resource of the physical uplink control channel for transmission of a scheduling request has been allocated, does not use the allocated radio resource. Even when a physical uplink control channel of the first format has been set in the sounding reference signal subframe of the first uplink component frequency band and the radio resource of a sounding reference signal has been set in the same uplink subframe in the second uplink component frequency band and further the radio resource of a physical uplink control channel signal has been set in the first uplink component frequency band (Case #3 of FIG. 7), the mobile station apparatus 5, when it is determined that a scheduling request is not transmitted to the base station apparatus 3, transmits only the sounding reference signal.

<Transmission Processing Flow of a Sounding Reference Signal and a Physical Uplink Control Channel Signal>

Figure 8:
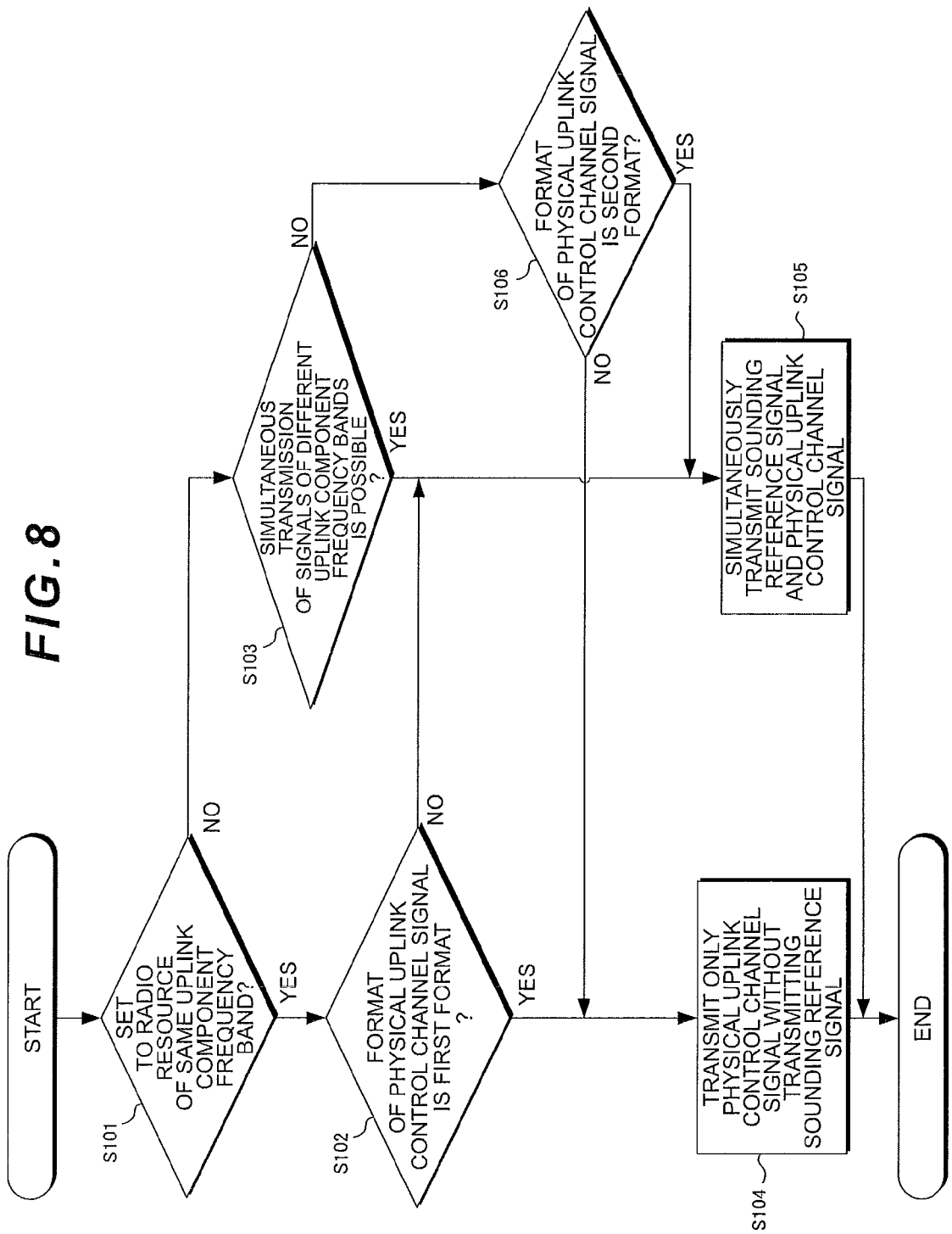
FIG. 8 is a flow chart showing an example of a transmission processing when the radio resources of a sounding reference signal and a physical uplink control channel signal of the mobile station apparatus 5 have been set in the same uplink subframe according to the embodiment of the invention.

FIG. 8 is a flow chart showing an example of a transmission processing when the radio resources of a sounding reference signal of the mobile station apparatus 5 and a physical uplink control channel signal have been set to the same uplink subframe, according to the embodiment of the present invention. FIG. 8 shows the processing in a unit of uplink subframe. The simultaneous transmission control unit 4051 determines whether or not a sounding reference signal and a physical uplink control channel signal have been set to a radio resource of the same uplink component frequency band (Step S101). The simultaneous transmission control unit 4051, when it is determined that the sounding reference signal and the physical uplink control channel signal have been set to the radio resource of the same uplink component frequency band (Step S101: YES), determines whether or not the format of the physical uplink control channel signal is the first format (Step S102). In contrast, the simultaneous transmission control unit 4051, when it is determined that the sounding reference signal and the physical uplink control channel signal have not been set to the radio resource of the same uplink component frequency band, i.e., that the sounding reference signal and the physical uplink control channel signal have been set to the radio resource of a different uplink component frequency band, respectively (Step S101: NO), determines whether or not the simultaneous transmission of the signals with different uplink component frequency bands is possible (Step S103). It should be noted that, the simultaneous transmission control unit 4051, based on control information indicating whether the simultaneous transmission of the signals with different uplink component frequency bands, notification of which the base station apparatus 3 provides, is permitted or prohibited, determines whether or not the simultaneous transmission of the signals with different uplink component frequency bands is possible.

In Step S102, the simultaneous transmission control unit 4051, when it is determined that the format of the physical uplink control channel signal is the first format (Step S102: YES), controls the transmission processing unit 407 so as to transmit only the physical uplink control channel signal without transmitting the sounding reference signal (Step S104). In contrast, in Step S102, the simultaneous transmission control unit 4051, when it is determined that the format of the physical uplink control channel signal is not the first format, i.e., that it is the second format (Step S102: NO), controls the transmission processing unit 407 so as to simultaneously transmit the sounding reference signal and the physical uplink control channel signal (Step S105).

In Step S103, the simultaneous transmission control unit 4051, when it is determined that the simultaneous transmission of the signals with different uplink component frequency bands is possible (Step S103: YES), controls the transmission processing unit 407 so as to simultaneously transmit the sounding reference signal and the physical uplink control channel signal (Step S105). In contrast, in Step S103, the simultaneous transmission control unit 4051, when it is determined that the simultaneous transmission of the signals with different uplink component frequency bands is not possible (Step S103: NO), determines whether or not the format of the physical uplink control channel signal is the second format (Step S106).

The simultaneous transmission control unit 4051, when it is determined that the format of the physical uplink control channel signal is the second format (Step S106: YES), controls the transmission processing unit 407 so as to simultaneously transmit the sounding reference signal and the physical uplink control channel signal (Step S105). In contrast, the simultaneous transmission control unit 4051, when it is determined that the format of the physical uplink control channel signal is not the second format, i.e., that it is the first format, controls the transmission processing unit 407 so as to transmit only the physical uplink control channel signal without transmitting the sounding reference signal (Step S104). After Step S104 and Step S105, the mobile station apparatus 5 completes the processing related to the control of the transmission processing of the sounding reference signal and the physical uplink control channel signal, and repeats the same processing with respect to the subsequent uplink subframes.

As described above, in the embodiment of the present invention, when the radio resources of a sounding reference signal and a physical uplink control channel signal have been set in the same uplink subframe, the mobile station apparatus 5, depending on whether each radio resource has been set to the same uplink component frequency band or each radio resource has been set to a different uplink component frequency band, can appropriately transmit the sounding reference signal and the physical uplink control channel signal by controlling the transmission processing of the sounding reference signal and the physical uplink control channel signal.

More specifically, in the case where the format of a physical uplink control channel signal is the first format in which a radio resource in a time domain to which a sounding reference signal may be allocated, i.e., an SC-FDMA symbol to which a sounding reference signal may be allocated, is used, the mobile station apparatus 5, when the radio resources of a sounding reference signal and a physical uplink control channel signal have been set to the same uplink component frequency band, performs control so as to transmit only the physical uplink control channel signal without transmitting the sounding reference signal. Thereby, an orthogonal sequence having the same sequence length as a physical uplink control channel with respect to the different mobile station apparatus 5, in which a radio resource (an uplink resource block) of the same frequency domain as this physical uplink control channel is used, can be appropriately used and the orthogonalization between the physical uplink control channel signals can be reliably realized.

The mobile station apparatus 5, when the radio resources of a sounding reference signal and a physical uplink control channel signal have been set to a different uplink component frequency band, respectively, performs control so as to simultaneously transmit the sounding reference signal and the physical uplink control channel signal. Thereby, the base station apparatus 3 can reliably achieve the orthogonalization between the signals of a physical uplink control channel with respect to a different mobile station apparatus 5, in which a radio resource in the same frequency domain as this physical uplink control channel is used, and also can measure the uplink channel quality of an uplink component frequency band in which the reference signal has been transmitted. Accordingly, the mobile station apparatus 5 can reliably transmit a scheduling request to the base station apparatus 3 and keep the delay required to complete the transmission of data small, while the base station apparatus 3 can improve the efficiency of scheduling, adaptive modulation, and transmit power control by using the measured uplink channel quality.

Moreover, the mobile station apparatus 5 can control the transmission processing suitable for each format by controlling the transmission processing of a sounding reference signal and a physical uplink control channel signal in accordance with the format of the physical uplink control channel signal. The mobile station apparatus 5, in addition to the first format, uses the second format that is a format, in which a radio resource in a time domain to which a sounding reference signal may be allocated, i.e., an SC-FDMA symbol to which a sounding reference signal may be allocated, is not used.

More specifically, in the case where the format of a physical uplink control channel signal is the second format, the mobile station apparatus 5, when the radio resources of a sounding reference signal and a physical uplink control channel signal have been set to the same uplink component frequency band, performs control so as to simultaneously transmit the sounding reference signal and the physical uplink control channel signal. Thereby, the base station apparatus 3 can reliably achieve the orthogonalization between the signals of a physical uplink control channel with respect to a different mobile station apparatus 5, in which a radio resource in the same frequency domain as this physical uplink control channel is used, and also can measure the uplink channel quality of an uplink component frequency band in which the sounding reference signal has been transmitted.

The mobile station apparatus 5, when the radio resources of a sounding reference signal and a physical uplink control channel signal have been set to a different uplink component frequency band, respectively, performs control so as to simultaneously transmit the sounding reference signal and the physical uplink control channel signal. Thereby, the base station apparatus 3 can reliably achieve the orthogonalization between the signals of a physical uplink control channel with respect to the different mobile station apparatus 5, in which a radio resource in the same frequency domain as this physical uplink control channel is used, and also can measure the uplink channel quality of an uplink component frequency band in which the sounding reference signal has been transmitted. Accordingly, the mobile station apparatus 5 can reliably transmit a scheduling request to the base station apparatus 3 and keep the delay required to complete the transmission of data small, while the base station apparatus 3 can improve the efficiency of scheduling, adaptive modulation, and transmit power control by using the measured uplink channel quality.

The mobile station apparatus 5 with the remaining small transmit power capable of transmission, in which the simultaneous transmission of the signals with different uplink component frequency bands is basically prohibited by the base station apparatus 3, when the first format is used for the physical uplink control channel signal and the radio resources of a sounding reference signal and the physical uplink control channel signal have been set to a different uplink component frequency band, respectively, transmits only the physical uplink control channel signal without transmitting the sounding reference signal for the reason of the restriction on the transmit power. However, when the second format is used for the physical uplink control channel signal and the radio resources of the sounding reference signal and the physical uplink control channel signal have been set to a different uplink component frequency band, respectively, the above-described mobile station apparatus 5 can simultaneously transmit the sounding reference signal and the physical uplink control channel signal in the same uplink subframe without concern for the restrictions on the transmit power.

Because the radio resources of a sounding reference signal and a physical uplink control channel signal of a different uplink component frequency band are set to different SC-FDMA symbols, respectively, and the mobile station apparatus 5 does not essentially simultaneously-transmit the signals with different uplink component frequency bands in a unit of SC-FDMA symbol, and the transmit power required for each of the sounding reference signal and the physical uplink control channel signal will not be simultaneously generated, the mobile station apparatus 5 with the remaining small transmit power capable of transmission, when the format of the physical uplink control channel signal is the second format, can simultaneously transmit the sounding reference signal and the physical uplink control channel signal, whose radio resources have been set to a different uplink component frequency band, respectively, in the same uplink subframe.

Accordingly, the mobile station apparatus 5 with the remaining small transmit power capable of transmission, when the format of the physical uplink control channel signal is the first format and the radio resources of the sounding reference signal and the physical uplink control channel signal have been set to a different uplink component frequency band, respectively, performs control to transmit the physical uplink control channel signal without transmitting the sounding reference signal. In contrast, when the format of the physical uplink control channel signal is the second format and the radio resources of the sounding reference signal and the physical uplink control channel signal have been set to a different uplink component frequency band, respectively, the above-described mobile station apparatus 5 performs control so as to simultaneously transmit the sounding reference signal and the physical uplink control channel signal. Thereby, the physical uplink control channel signal and the sounding reference signal can be appropriately transmitted in consideration of the restrictions on transmit power.

It should be noted that, in the uplink subframe that is not a sounding reference signal subframe, the format of a physical uplink control channel signal is the first format. Therefore, when the radio resources of a sounding reference signal and a physical uplink control channel signal have been allocated to a different uplink component frequency band, respectively, and the uplink subframe of an uplink component frequency band, to which the radio resource of the physical uplink control channel signal has been allocated, is not a sounding reference signal subframe, the mobile station apparatus 5 with the remaining small transmit power capable of transmission transmits only the physical uplink control channel signal without transmitting the sounding reference signal. It should be noted that, here, a case is being described, where the uplink subframe with respect to an uplink component frequency band, to which the radio resource of the sounding reference signal has been allocated, is a sounding reference signal subframe, and the uplink subframe with respect to an uplink component frequency band, to which the radio resource of the physical uplink control channel signal has been allocated, is not a sounding reference signal subframe. When the radio resources of a sounding reference signal and a physical uplink control channel signal have been allocated to a different uplink component frequency band, respectively, and the uplink subframe of an uplink component frequency band, to which the radio resource of the physical uplink control channel signal has been allocated, is a sounding reference signal subframe, the mobile station apparatus with the remaining small transmit power capable of transmission 5 determines, in accordance with the format of the physical uplink control channel signal, whether the sounding reference signal and the physical uplink control channel signal are simultaneously transmitted or only the physical uplink control channel signal is transmitted.

It should be noted that, the present invention is not limited to the physical uplink control channel signal for transmission of a scheduling request. For example, the present invention can be applied also to a physical uplink control channel signal for transmission of a reception confirmation response, in which the first format and the second format as shown in FIG. 12 are used. The mobile station apparatus 5 transmits the reception confirmation response with respect to a physical downlink shared channel signal in a sounding reference signal subframe by using a physical uplink control channel of the first format or the second format. The mobile station apparatus 5, as with the case of the physical uplink control channel for transmission of a scheduling request described in the above embodiment, based on control information indicating whether the first format is used or the second format is used for the format of a physical uplink control channel signal in a sounding reference signal subframe, selects the format of the physical uplink control channel signal for transmission of a reception confirmation response.

Figure 9:
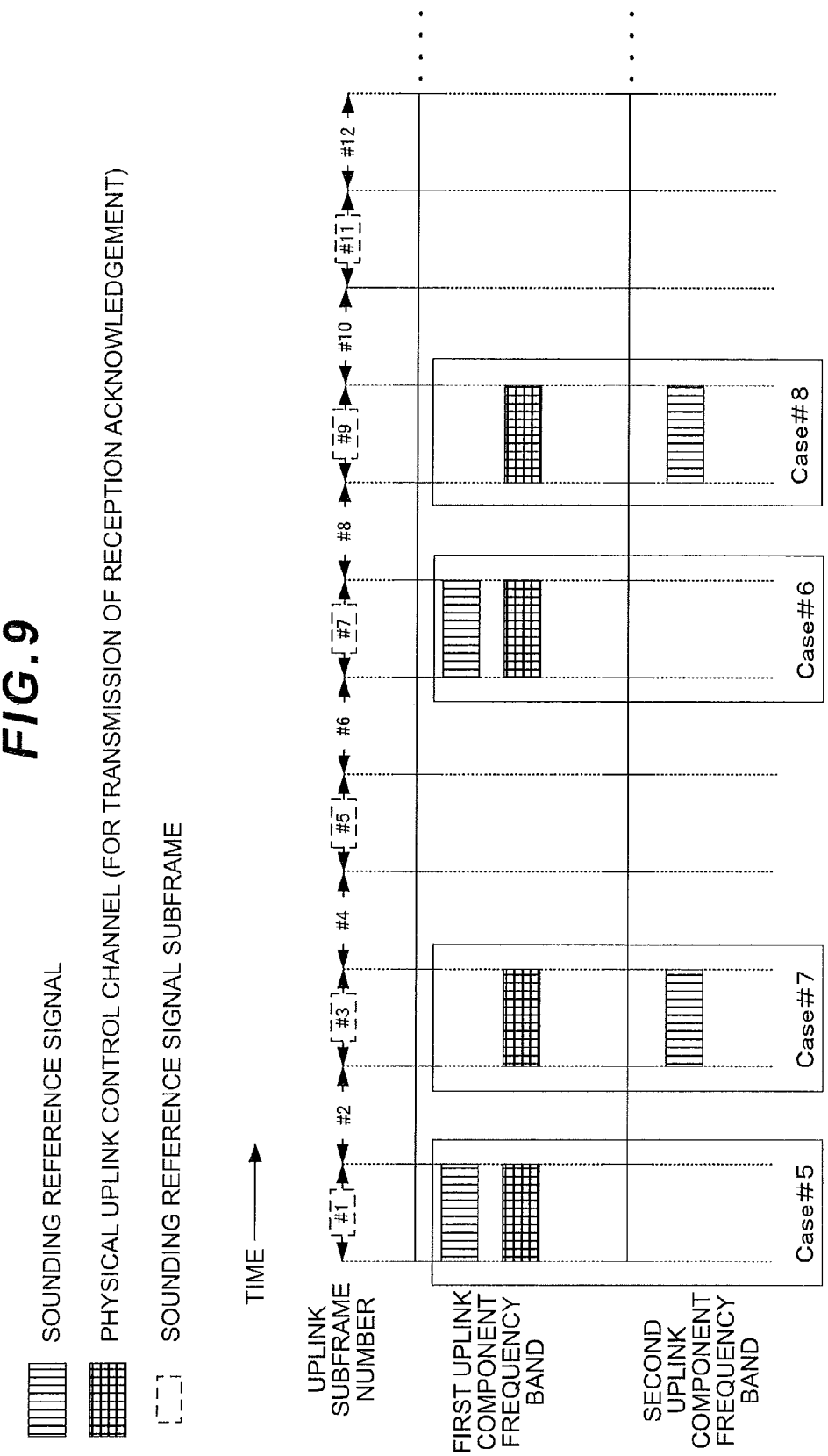
FIG. 9 is a diagram showing an example of a combination of radio resources set for a sounding reference signal and a physical uplink control channel signal for transmission of a reception confirmation response in the embodiment of the present invention.

FIG. 9 is a diagram showing an example of a combination of the radio resources set to the sounding reference signal and the physical uplink control channel signal for transmission of a reception confirmation response in the embodiment of the present invention. Here, a case will be described, where two uplink component frequency bands (the first uplink component frequency band and the second uplink component frequency band) are used. A case will be described, where in the first uplink component frequency band and the second uplink component frequency band, a sounding reference signal subframe has been set for every two uplink subframes. Moreover, a case will be described, where in the first uplink component frequency band and the second uplink component frequency band, the radio resource of a sounding reference signal has been allocated for every three sounding reference signal subframes. Furthermore, a case will be described, where in the first uplink component frequency band, the first format is set to the physical uplink control channel of the sounding reference signal subframe up to the uplink subframe #4 and the second format is set to the physical uplink control channel of the sounding reference signal subframe of the uplink subframe #5 and thereafter.

First, a case will be described, where the radio resources of a sounding reference signal and a physical uplink control channel are set only to one of the uplink component frequency bands. A case will be described, where a physical uplink control channel of the first format is set in the sounding reference signal subframe of the first uplink component frequency band. The mobile station apparatus 5, when the radio resources of a sounding reference signal and a physical uplink control channel signal have been set to the same uplink subframe in the first uplink component frequency band (Case #5 of FIG. 9), transmits only the physical uplink control channel signal without transmitting the sounding reference signal.

A case will be described, where a physical uplink control channel of the second format is set in the sounding reference signal subframe of the first uplink component frequency band. The mobile station apparatus 5, when the radio resources of a sounding reference signal and a physical uplink control channel signal have been set to the same uplink subframe in the first uplink component frequency band (Case #6 of FIG. 9), simultaneously transmits the sounding reference signal and the physical uplink control channel signal.

Next, a case will be described, where the radio resources of a sounding reference signal and a physical uplink control channel are set to a different uplink component frequency band, respectively. A case will be described, where the physical uplink control channel of the first format is set in the sounding reference signal subframe of the first uplink component frequency band. The mobile station apparatus 5, when the radio resource of a sounding reference signal has bee set in the same uplink subframe in the second uplink component frequency band, and the radio resource of a physical uplink control channel signal has been set in the first uplink component frequency band (Case #7 of FIG. 9), simultaneously transmits the sounding reference signal and the physical uplink control channel signal. It should be noted that, the mobile station apparatus 5 having the remaining small transmit power capable of transmission, based on an instruction from the base station apparatus 3, when the radio resources of a sounding reference signal and a physical uplink control channel signal have been set to the same uplink subframe in a different uplink component frequency band, transmits only the physical uplink control channel signal without transmitting the sounding reference signal.

A case will be described, where the physical uplink control channel of the second format is set in the sounding reference signal subframe of the first uplink component frequency band. The mobile station apparatus 5, when the radio resource of a sounding reference signal has been set in the same uplink subframe in the second uplink component frequency band, and the radio resource of a physical uplink control channel signal has been set in the first uplink component frequency band (Case #8 of FIG. 9), simultaneously transmits the sounding reference signal and the physical uplink control channel signal. It should be noted that, the mobile station apparatus 5, regardless of the remaining transmit power capable of transmission, when the radio resources of a sounding reference signal and a physical uplink control channel signal have been set to the same uplink subframe with a different uplink component frequency band and the format of the physical uplink control channel signal is the second format, simultaneously transmits the sounding reference signal and the physical uplink control channel signal.

It should be noted that, the radio resource of the physical uplink control channel signal for transmission of a reception confirmation response is allocated to the uplink subframe after a predetermined period, e.g., after four downlink subframes, from the downlink subframe to which the radio resource of the physical downlink shared channel signal has been allocated. In the case of the radio resource of a physical uplink control channel signal for transmission of a reception confirmation response, which is different from the radio resource of a physical uplink control channel signal for transmission of a scheduling request, a periodic radio resource is not allocated from the base station apparatus 3 in advance, but notification of a radio resource allocation result of the physical uplink control channel signal is provided for every downlink subframe. For example, the mobile station apparatus 5, when having detected a physical downlink control channel addressed to its own apparatus including information about the radio resource allocation of a physical downlink shared channel, determined that the radio resource of a physical uplink control channel signal corresponding to the radio resource used for a physical downlink control channel signal has been allocated, while when not having detected a physical downlink control channel addressed to its own apparatus, the mobile station apparatus 5 determines that the radio resource of a physical uplink control channel signal has not been allocated. It should be noted that, a radio resource that may be used in a physical downlink control channel signal within a downlink system bandwidth and a radio resource that may be used in the physical uplink control channel signal for transmission of a reception confirmation response within an uplink system bandwidth are associated with each other in advance, and the base station apparatus 3 and the mobile station apparatus 5 recognize this association.

As described above, the mobile station apparatus 5 of the present invention can appropriately transmit a sounding reference signal and a physical uplink control channel signal for transmission of a reception confirmation response. In the case where the format of the physical uplink control channel signal is the first format, the mobile station apparatus 5, when the radio resources of the sounding reference signal and the physical uplink control channel signal have been set to the same uplink component frequency band, performs control so as to transmit only the physical uplink control channel signal without transmitting the sounding reference signal. Thereby, an orthogonal sequence having the same sequence length as the physical uplink control channel with respect to the different mobile station apparatus 5, in which a radio resource (an uplink resource block) of the same frequency domain as this physical uplink control channel is used, can be appropriately used and the orthogonalization between the physical uplink control channel signals can be reliably realized.

The mobile station apparatus 5, when the radio resources of a sounding reference signal and a physical uplink control channel signal have been set to a different uplink component frequency band, respectively, performs control so as to simultaneously transmit the sounding reference signal and the physical uplink control channel signal. Thereby, the base station apparatus 3 can measure the uplink channel quality of an uplink component frequency band in which the sounding reference signal has been transmitted, while reliably achieving the orthogonalization between the signals of a physical uplink control channel with respect to the different mobile station apparatus 5, in which a radio resource in the same frequency domain as this physical uplink control channel is used. Accordingly, the mobile station apparatus 5 can reliably transmit a reception result with respect to a physical downlink shared channel signal to the base station apparatus 3, and the base station apparatus 3 can suppress an unnecessary retransmission and achieve an efficient retransmission control. Furthermore, the base station apparatus 3 can improve the efficiency of scheduling, adaptive modulation, and transmit power control by using the measured uplink channel quality.

In the case where the format of a physical uplink control channel signal is the second format, the mobile station apparatus 5, when the radio resources of the sounding reference signal and the physical uplink control channel signal have been set to the same uplink component frequency band, performs control so as to simultaneously transmit the sounding reference signal and the physical uplink control channel signal. Thereby, the base station apparatus 3 can measure the uplink channel quality of an uplink component frequency band in which the sounding reference signal has been transmitted, while reliably achieving the orthogonalization between the signals of a physical uplink control channel with respect to the different mobile station apparatus 5, in which a radio resource in the same frequency domain as this physical uplink control channel is used.

The mobile station apparatus 5, when the radio resources of a sounding reference signal and a physical uplink control channel signal have been set to a different uplink component frequency band, respectively, performs control so as to simultaneously transmit the sounding reference signal and the physical uplink control channel signal. Thereby, the base station apparatus 3 can measure the uplink channel quality of an uplink component frequency band in which the sounding reference signal has been transmitted, while reliably achieving the orthogonalization between the signals of a physical uplink control channel with respect to the different mobile station apparatus 5, in which a radio resource in the same frequency domain as this physical uplink control channel is used.

The mobile station apparatus 5 can reliably transmit a reception result with respect to a physical downlink shared channel signal to the base station apparatus 3, while the base station apparatus 3 can suppress an unnecessary retransmission and achieve an efficient retransmission control, and improve the efficiency of scheduling, adaptive modulation, and transmit power control by using the measured uplink channel quality. The mobile station apparatus 5 with the remaining small transmit power capable of transmission, in which the simultaneous transmission of the signals with different uplink component frequency bands is basically prohibited by the base station apparatus 3, when the first format is used for the physical uplink control channel signal and the radio resources of the sounding reference signal and the physical uplink control channel signal have been set to a different uplink component frequency band, respectively, transmits only the physical uplink control channel signal without transmitting the sounding reference signal for the reason of the restriction on the transmit power. In contrast, the mobile station apparatus 5, when the second format is used for the physical uplink control channel signal and the radio resources of the sounding reference signal and the physical uplink control channel signal have been set to a different uplink component frequency band, respectively, can simultaneously transmit the sounding reference signal and the physical uplink control channel signal in the same uplink subframe without concern for the restrictions on the transmit power.

Accordingly, the mobile station apparatus 5 with the remaining small transmit power capable of transmission, when the format of the physical uplink control channel signal is the first format and the radio resources of the sounding reference signal and the physical uplink control channel signal have been set to a different uplink component frequency band, respectively, performs control so as to transmit the physical uplink control channel signal without transmitting the sounding reference signal, while when the format of the physical uplink control channel signal is the second format and the radio resources of the sounding reference signal and the physical uplink control channel signal have been set to a different uplink component frequency band, respectively, the above-described mobile station apparatus 5 performs control so as to simultaneously transmit the sounding reference signal and the physical uplink control channel signal, and thus a physical uplink control channel signal for transmission of a reception confirmation response and a sounding reference signal can be appropriately transmitted in consideration of the restrictions on the transmit power.

It should be noted that the present invention is not limited to the radio communication system 1 composed of the number of uplink component frequency bands that are used for description in the above-described embodiment. The present invention can be applied also to the radio communication system 1 composed of a different number of uplink component frequency bands.

It should be noted that, in the above embodiment of the present invention, a case has been shown, where the radio resource of a sounding reference signal is set in advance by the mobile station apparatus 5 by using a physical downlink shared channel, but the present invention can be applied also to a case where the allocation of the radio resource of a sounding reference signal is performed by using a physical downlink control channel for each subframe. The base station apparatus 3 determines whether or not the allocation of the radio resource of a sounding reference signal is performed on the mobile station apparatus 5 for each downlink subframe, and if it is determined that the radio resource allocation of a sounding reference signal is performed, the base station apparatus 3 transmits a physical downlink control channel including the information about the radio resource allocation of a sounding reference signal to the mobile station apparatus 5.

The mobile station apparatus 5 performs the detection processing of a physical downlink control channel signal addressed to its own apparatus including the radio resource allocation of a sounding reference signal, for each downlink subframe, and when the physical downlink control channel signal addressed to its own apparatus including the radio resource allocation of a sounding reference signal has been detected, the mobile station apparatus 5 recognizes that the radio resource of the sounding reference signal has been allocated in an uplink subframe corresponding to the downlink subframe, in which the physical downlink control channel signal has been detected, e.g., in an uplink subframe corresponding to the fourth downlink subframe after the downlink subframe in which the physical downlink control channel signal has been detected, or in the temporally closest sounding reference signal subframe after a predetermined period from the downlink subframe in which the physical downlink control channel signal has been detected, or in a predetermined sounding reference signal subframe. When the radio resource of a physical uplink control channel signal has been allocated in the same uplink subframe as the uplink subframe to which the radio resource of a sounding reference signal has been allocated, the mobile station apparatus 5, according to whether each radio resource has been set to the same uplink component frequency band or each radio resource has been set to a different uplink component frequency band, controls the transmission processing of a sounding reference signal and a physical uplink control channel signal.

Here, the format of a physical downlink control channel signal including the information about the radio resource allocation of a sounding reference signal may differ from the format of a physical downlink control channel signal including other information, or the same format may be applied. When the same format is applied, the mobile station apparatus 5 modifies the interpretation of a different information field in accordance with a value of the information field of a part of the format, and determines whether a physical downlink control channel signal includes the information about the radio resource allocation of a sounding reference signal or includes other information. Moreover, a single physical downlink control channel may include the information about the radio resource allocation of a sounding reference signal of the single mobile station apparatus 5, or may include the information about the radio resource allocation of a sounding reference signal of a plurality of mobile station apparatuses 5. Furthermore, the mobile station apparatus 5 is not limited to a moving terminal, and the present invention may be realized, for example, by implementing the function of the mobile station apparatus into a fixed terminal.

The characteristic procedure of the present invention described above can be realized also by implementing the function into an integrated circuit and controlling the same. That is, an integrated circuit of the present invention is an integrated circuit causing the mobile station apparatus 5 to perform a plurality of functions when being mounted on the mobile station apparatus 5, the integrated circuit causing the mobile station apparatus to perform a series of functions including the functions of: transmitting a signal to a base station apparatus 3 by using one or more component frequency bands each having a predetermined frequency bandwidth; setting a radio resource of a reference signal for measuring channel quality and a radio resource of a physical uplink control channel; controlling a signal transmission processing depending on whether each radio resource has been set to a same component frequency band or each radio resource has been set to a different, when transmitting the physical uplink control channel signal in a time frame in which the radio resource of the reference signal has been set; and transmitting the reference signal and/or physical uplink control channel signal based on the control of the signal transmission processing.

In this manner, the mobile station apparatus 5 using the integrated circuit of the present invention, when the radio resources of a sounding reference signal and a physical uplink control channel signal have been set in the same uplink subframe, according to whether each radio resource has been set to the same uplink component frequency band or each radio resource has been set to a different uplink component frequency band, controls the transmission processing of the sounding reference signal and the physical uplink control channel signal. Thereby, the mobile station apparatus 5 can appropriately transmit the sounding reference signal and the physical uplink control channel signal.

A program operating in the mobile station apparatus 5 and the base station apparatus 3 according to the present invention is a program (a program causing a computer to function) that controls a CPU and the like so as to realize the functions of the above-described embodiment according to the present invention. Then, the information handled in these device and apparatus is temporarily stored in a RAM during the information processing, and is then stored in various ROMs or HDD, and is read, modified, and/or written by the CPU as required. As the recording medium storing the program, any of a semiconductor medium (e.g., ROM, a nonvolatile memory card, etc.), an optical recording medium (e.g., DVD, MO, MD, CD, BD, etc.), and a magnetic recording medium (e.g., a magnetic tape, a flexible disk, etc.) may be employed. Moreover, not only the functions of the above-described embodiment may be realized by executing a loaded program, but also the functions of the present invention may be realized by processing in conjunction with an operating system or other application programs according to an instruction of the program.

Moreover, when circulating the program in the market, the program can be stored into a portable recording medium and circulated, or the program can be transferred to a server computer coupled via a network, such as the Internet. In this case, a storage device of the server computer is also within the scope of the present invention. Moreover, a part or the whole of the mobile station apparatus 5 and the base station apparatus 3 in the above-described embodiment may be realized as an LSI that is typically an integrated circuit. Each functional block of the mobile station apparatus 5 and the base station apparatus 3 may be individually formed in one chip, or a part or the whole thereof may be integrated and formed in one chip. Moreover, the integration approach is not limited to an LSI, but may be realized by an application specific circuit or a general-purpose processor. Moreover, if an integration technology replacing the LSI would have emerged due to a progress in the semiconductor technologies, an integrated circuit by means of this technique may be used.

In the foregoing, the embodiment of the present invention has been described in detail with reference to the accompanying drawings, but the specific configuration is not limited to this embodiment, and the design and the like that do not depart from the scope of the present invention are also within the scope of the claims.

DESCRIPTION OF REFERENCE NUMERALS 3 base station apparatus
5 (A-C) mobile station apparatus
101 reception processing unit
103 radio resource control unit
105 control unit
107 transmission processing unit
109 receiving antenna
111 transmission antenna
201 physical downlink shared channel processing unit
203 physical downlink control channel processing unit
205 downlink pilot channel processing unit
207 multiplexing unit
209 IFFT unit
211 GI insertion unit
213 D/A unit
215 RF transmission unit
219 turbo coding unit
221 data modulation unit
223 convolutional coding unit
225 QPSK modulation unit
301 RF receiving unit
303 A/D unit
305 component frequency band separating unit
307 reception processing unit for each uplink component frequency band
309 symbol timing detection unit
311 GI removing unit
313 FFT unit
315 subcarrier demapping unit
317 channel estimation unit
319 channel equalization unit (for physical uplink shared channels)
321 channel equalization unit (for physical uplink control channels)
323 IDFT unit
325 data demodulation unit
327 turbo decoding unit
329 physical uplink control channel detection unit
331 uplink channel quality measuring unit
401 reception processing unit
403 radio resource control unit
405 control unit
407 transmission processing unit
409 receiving antenna
501 RF receiving unit
503 A/D unit
505 symbol timing detection unit
507 GI removing unit
509 FFT unit
511 de-multiplexing unit
513 channel estimation unit
515 downlink channel quality measuring unit
516 channel compensation unit (for physical downlink shared channels)
517 physical downlink shared channel decoding unit
519 channel compensation unit (for physical downlink control channels)
521 physical downlink control channel decoding unit
523 data demodulation unit
525 turbo decoding unit
527 QPSK demodulation unit
529 VITERB decoder unit
601 transmission processing unit for each uplink component frequency band
603 component frequency band combining unit
605 D/A unit
607 RF transmission unit
611 turbo coding unit
613 data modulation unit
615 DFT unit
617 uplink pilot channel processing unit
619 physical uplink control channel processing unit
621 subcarrier mapping unit
623 IFFT unit
624 multiplication unit
625 GI insertion unit
4051 simultaneous transmission control unit

The invention claimed is:

1. A mobile station apparatus comprising:
a transmission processor configured to transmit at least a signal by using one or more component frequency bands each having a predetermined frequency bandwidth, wherein
the transmission processor is configured to
in a case that transmission of an SRS (Sounding Reference Signal) for a first component frequency band and transmission of a PUCCH (Physical Uplink Control Channel) for a second component frequency band are set in the same subframe, determine based on a format of the PUCCH whether to
transmit only the PUCCH of a first format, without transmitting the SRS, or
simultaneously transmit the SRS and the PUCCH of a second format,
the first format is a format which is based on an orthogonal sequence with a sequence length of 4 for a second slot of the subframe and the second format is a format which is based on an orthogonal sequence with a sequence length of 3 for the second slot of the subframe, in a case that the subframe is an SRS subframe of the second component frequency band to which transmission of the PUCCH is set, the transmission processor is configured to transmit only the PUCCH of the first format without transmitting the SRS, and simultaneously transmit the PUCCH of the second format and the SRS, and in a case that the subframe is not the SRS subframe, the transmission processor is configured to transmit only the PUCCH of the first format without transmitting the SRS.

2. The mobile station apparatus according to claim 1, wherein in the first format, all SC-FDMA symbols of a subframe are used, and in the second format, SC-FDMA symbols excluding the last SC-FDMA symbol of the subframe are used.

3. The mobile station apparatus according to claim 1, wherein the PUCCH is a PUCCH used for transmission of a scheduling request or for transmission of a reception acknowledgement response.

4. A communication method for a mobile station apparatus configured to communicate with a base station apparatus, the communication method comprising:

transmitting at least a signal by using one or more component frequency bands each having a predetermined frequency bandwidth, wherein transmitting at least the signal comprises:

in a case that transmission of an SRS (Sounding Reference Signal) for a first component frequency band and transmission of a PUCCH (Physical Uplink Control Channel) for a second component frequency band are set in the same subframe, determining based on a format of the PUCCH whether to transmit only the PUCCH of a first format without transmitting the SRS, or simultaneously transmit the SRS and the PUCCH of a second format, the first format is a format which is based on an orthogonal sequence with a sequence length of 4 for a second slot of the subframe, and the second format is a format which is based on an orthogonal sequence with a sequence length of 3 for the second slot of the subframe, transmitting only the PUCCH of the first format without transmitting the SRS, and simultaneously transmitting the PUCCH of the second format and the SRS, in a case that the subframe is an SRS subframe of the second component frequency band to which transmission of the PUCCH is set; and transmitting only the PUCCH of the first format without transmitting the SRS, in a case that the subframe is not the SRS subframe.

5. The communication method according to claim 4, wherein in the first format, all SC-FDMA symbols of a subframe are used, and in the second format, SC-FDMA symbols excluding the last SC-FDMA symbol of the subframe are used.

6. The communication method according to claim 4, wherein the PUCCH is a PUCCH used for transmission of a scheduling request or for transmission of a reception acknowledgement response.

7. An integrated circuit to be mounted on a mobile station apparatus, the integrated circuit causing the mobile station apparatus to perform at least functions of:

transmitting at least a signal by using one or more component frequency bands each having a predetermined frequency bandwidth, wherein transmitting at least the signal comprises:

in a case that transmission of an SRS (Sounding Reference Signal) for a first component frequency band and transmission of a PUCCH (Physical Uplink Control Channel) for a second component frequency band are set in a same subframe, determining based on a format of the PUCCH whether to transmit only the PUCCH of a first format without transmitting the SRS, or simultaneously transmit the SRS and the PUCCH of a second format, the first format is a format which is based on an orthogonal sequence with a sequence length of 4 for a second slot of the subframe and the second format is a format which is based on an orthogonal sequence with a sequence length of 3 for the second slot of the subframe, in a case that the subframe is an SRS subframe of the second component frequency band to which transmission of the PUCCH is set, and in a case that the PUCCH is the PUCCH of the first format, transmitting only the PUCCH of the first format without transmitting the SRS;

in a case that the subframe is an SRS subframe to which transmission of the PUCCH is set, and in a case that the PUCCH is the PUCCH of the second format, simultaneously transmitting the PUCCH of the second format and the SRS; and in a case that the subframe is not the SRS subframe, transmitting only the PUCCH of the first format without transmitting the SRS.

8. The integrated circuit according to claim 7, wherein in the first format, all SC-FDMA symbols of a subframe are used, and in the second format, SC-FDMA symbols excluding the last SC-FDMA symbol of the subframe are used.

9. The integrated circuit according to claim 7, wherein the PUCCH is a PUCCH used for transmission of a scheduling request or for transmission of a reception acknowledgement response.

10. A radio communication system comprising:

at least a mobile station apparatus; and a base station apparatus configured to perform transmission/reception of a signal by using one or more component frequency bands each having a predetermined frequency bandwidth, wherein the base station apparatus is configured to receive a signal transmitted from the mobile station apparatus, the mobile station apparatus is configured to, in a case that transmission of an SRS (Sounding Reference Signal) for a first component frequency band and transmission of a PUCCH (Physical Uplink Control Channel) for a second component frequency band are set in a same subframe, determine based on a format of the PUCCH whether to transmit only the PUCCH of a first format without transmitting the SRS, or simultaneously transmit the SRS and the PUCCH of a second format, the first format is a format which is based on an orthogonal sequence with a sequence length of 4 for the second slot of the subframe, and the first format is a format in which is based on an orthogonal sequence with a sequence length of 3 for the second slot of the subframe, in a case that the subframe is an SRS subframe of the second component frequency band to which transmission of the PUCCH is set, the transmission processor is configured to transmit only the PUCCH of the first format without transmitting the SRS, and simultaneously transmit the PUCCH of the second format and the SRS, and in a case that the subframe is not the SRS subframe, the transmission processor is configured to transmit only the PUCCH of the first format without transmitting the SRS.

* * * * *